(12) United States Patent
Lee et al.

(10) Patent No.: US 9,912,804 B2
(45) Date of Patent: Mar. 6, 2018

(54) APPARATUS AND METHOD FOR MITIGATING INTERFERENCE IN WIRELESS COMMUNICATION SYSTEM

(71) Applicant: Samsung Electronics Co., Ltd., Gyeonggi-do (KR)

(72) Inventors: Sung-Jin Lee, Gyeonggi-do (KR); Jung-Soo Jung, Gyeonggi-do (KR); Sun-Heui Ryoo, Gyeonggi-do (KR); Jung-Min Moon, Gyeonggi-do (KR); Anshuman Nigam, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 237 days.

(21) Appl. No.: 14/728,539

(22) Filed: Jun. 2, 2015

(65) Prior Publication Data

US 2015/0351105 A1    Dec. 3, 2015

(30) Foreign Application Priority Data

Jun. 2, 2014    (KR) ........................ 10-2014-0067116

(51) Int. Cl.
*H04M 3/22*    (2006.01)
*H04W 16/10*    (2009.01)
(Continued)

(52) U.S. Cl.
CPC ............. *H04M 3/22* (2013.01); *H04W 16/10* (2013.01); *H04W 24/02* (2013.01);
(Continued)

(58) Field of Classification Search
None
See application file for complete search history.

(56) References Cited

U.S. PATENT DOCUMENTS

2010/0203887 A1    8/2010    Kim
2013/0272170 A1    10/2013    Chatterjee et al.
(Continued)

FOREIGN PATENT DOCUMENTS

KR    1020140057120    5/2014
WO    WO 2013/111601    8/2013

OTHER PUBLICATIONS

BlackBarry UK Limited, "Signaling between Inter-eNB to Support CoMP with NIB", R1-135552, 3GPP TSG RAN WG1 Meeting #75, Nov. 11-15, 2013, 7 pages.
(Continued)

*Primary Examiner* — Christine Duong
(74) *Attorney, Agent, or Firm* — The Farrell Law Firm, P.C.

(57) ABSTRACT

The present disclosure relates to a pre-5th-Generation (5G) or 5G communication system for supporting higher data rates Beyond 4th-Generation (4G) communication system such as Long Term Evolution (LTE). An apparatus of a Base Station (BS) in a wireless communication system is provided. The apparatus includes a wireless communication unit that is configured to receive an interference signal which cannot be controlled during a first period, and all interference signals during a second period with respect to a plurality of channels and a controller configured to determine a size of an interference signal which can be controlled, using a difference between a measurement of all the interference signals during the second period and a measurement of the interference signal which cannot be controlled, and select one of the plurality of channels according to the determined size of the interference signal which can be controlled.

32 Claims, 27 Drawing Sheets

(51) Int. Cl.
*H04W 72/12* (2009.01)
*H04W 24/02* (2009.01)
H04W 24/08 (2009.01)
H04B 17/318 (2015.01)

(52) U.S. Cl.
CPC ....... *H04W 72/1226* (2013.01); *H04B 17/318* (2015.01); *H04W 24/08* (2013.01)

(56) References Cited

U.S. PATENT DOCUMENTS

2013/0336156 A1 12/2013 Wei et al.
2014/0128115 A1 5/2014 Siomina et al.

OTHER PUBLICATIONS

International Search Report dated Sep. 17, 2015 issued in counterpart application No. PCT/KR2015/005539, 9 pages.
IEEE Standard for Information Technology—Telecommunications and Information Exchange between Systems—Local and Metropolitan Area Networks—Specific Requirements, Part 11: Wireless LAN Medium Access Control (MAC) and Physical Layer (PHY) Specifications (Mar. 29, 2012).

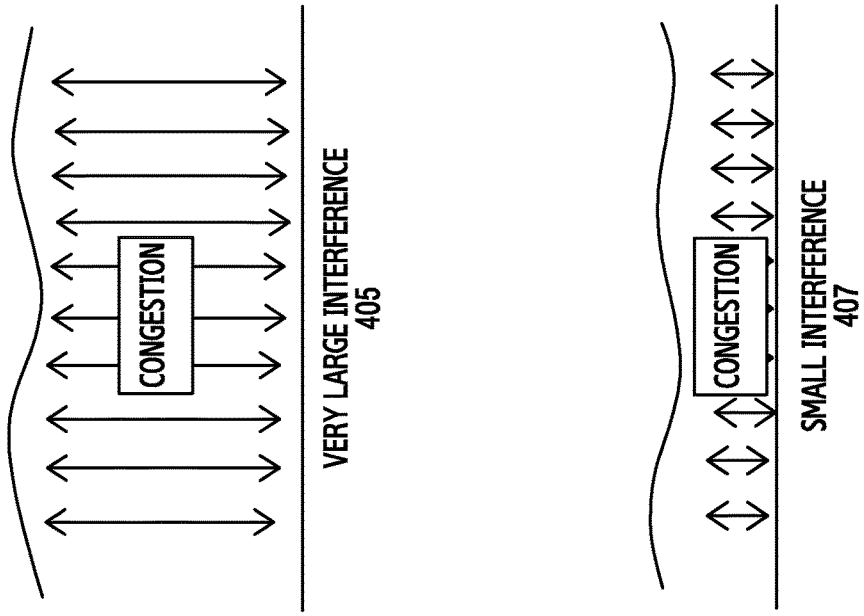
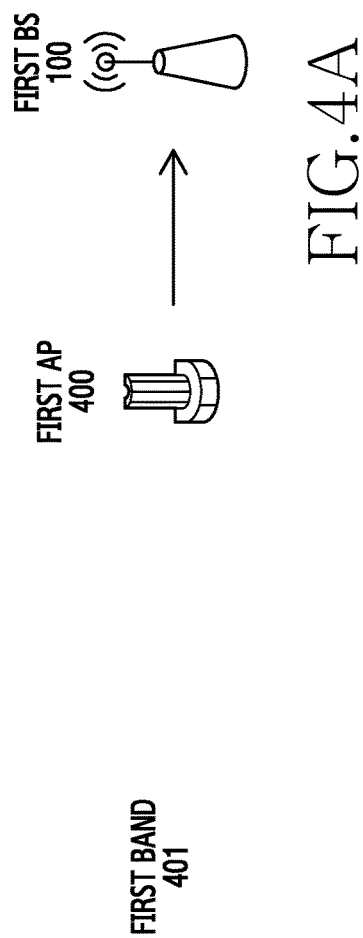
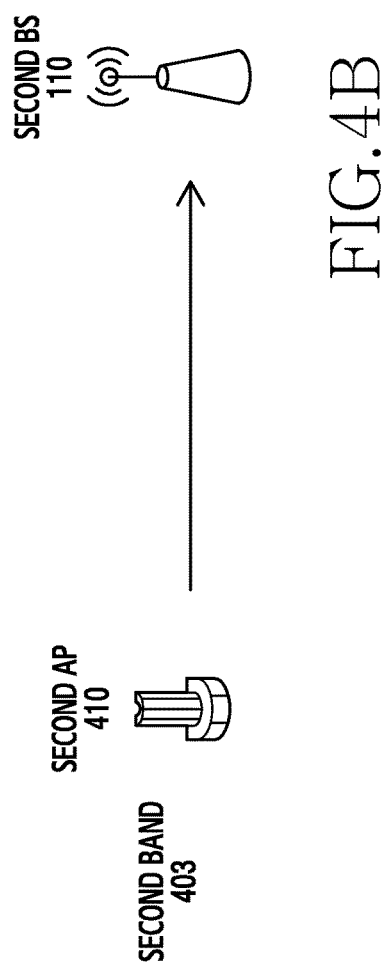
FIG. 4A
FIG. 4B

APPARATUS AND METHOD FOR MITIGATING INTERFERENCE IN WIRELESS COMMUNICATION SYSTEM

PRIORITY

This application claims priority under 35 U.S.C. § 119(a) to Korean Patent Application Serial No. 10-2014-0067116, which was filed in the Korean Intellectual Property Office on Jun. 2, 2014, the entire content of which is incorporated herein by reference.

BACKGROUND OF THE INVENTION

1. Field of the Invention

The present invention relates generally to an apparatus and a method, and more particularly to an apparatus and method for mitigating interference in a wireless communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier(FBMC), non-orthogonal multiple access (NOMA), and sparse code multiple access (SCMA) as an advanced access technology have been developed.

With the development of communication technologies, users can more conveniently communicate with each other. However, due to the rapid increase in users, a wireless communication environment using limited frequency resources may have an interference problem occurring with many users. Accordingly, the necessity for a method of removing and canceling interference in the wireless communication environment has increased.

When the LTE communication scheme and a Wi-Fi communication scheme operate at the same time on an unlicensed band, communication entities using the LTE communication scheme may incur very serious performance deterioration.

SUMMARY OF THE INVENTION

The present invention has been made to address at least the above mentioned problems and/or disadvantages and to provide at least the advantages described below.

An aspect of the present invention provides an apparatus and a method for selecting a channel by identifying an interference source in a wireless communication system.

An aspect of the present invention provides an apparatus and a method for measuring a channel occupancy rate in a multi-level in a wireless communication system.

An aspect of the present invention provides an apparatus and a method for selecting a channel priority according to interference identified in a wireless communication system.

An aspect of the present invention provides an apparatus and a method for improving a channel selection process through feedback for a User Equipment (UE) in a wireless communication system.

In accordance with an aspect of the present invention, there is provided an apparatus of a BS in a wireless communication system. The apparatus includes a wireless communication unit that is configured to receive an interference signal which cannot be controlled during a first period, and all interference signals during a second period with respect to a plurality of channels, and a controller that is configured to determine a size of an interference signal which can be controlled, using a difference between a measurement of all the interference signals during the second period and a measurement of the interference signal which cannot be controlled, and select one of the plurality of channels according to the determined size of the interference signal which can be controlled.

In accordance with an aspect of the present invention, there is provided an apparatus of a server in a wireless communication system. The apparatus includes a backhaul communication unit that is configured to transmit at least a portion of interference control information and first period information to a plurality of BSs.

In accordance with an aspect of the present invention, there is provided a method of operating a BS in a wireless communication system. The method includes receiving an interference signal which cannot be controlled during a first period, and all interference signals during a second period with respect to a plurality of channels, determining a size of an interference signal which can be controlled, using a difference between a measurement of all the interference signals during the second period and a measurement of the interference signal which cannot be controlled, and selecting one of the plurality of channels according to the determined size of the interference signal which can be controlled.

In accordance with an aspect of the present invention, there is provided a method of operating a server in a wireless communication system. The method includes transmitting at least a portion of interference control information and first period information to a plurality of BSs.

In accordance with an aspect of the present invention, there is provided an apparatus of a BS in a wireless communication system. The apparatus includes a backhaul communication unit that is configured to receive first synchronization control signals for a first communication service from a first set of adjacent BSs and receive a second synchronization control signal for a second communication service from at least one BS in a second set of adjacent BSs, which are different from the first set of BSs, and a controller configured to detect a synchronization frame position for a first synchronization signal from the first synchronization control signals and detect a second synchronization signal from the second synchronization signal control signal using the detected synchronization frame position.

In accordance with an aspect of the present invention, there is provided a method of operating a BS in a wireless communication system. The method includes receiving first synchronization control signals for a first communication service from a first set of adjacent BSs, detecting a synchronization frame position for a first synchronization signal from the first synchronization control signals, receiving a second synchronization control signal for a second communication service from at least one BS in a second set of adjacent BSs which are different from the first set of BSs, and detecting a second synchronization signal from the second synchronization signal control signal using the detected synchronization frame position.

BRIEF DESCRIPTION OF THE DRAWINGS

The above and other aspects, features, and advantages of the present invention will be more apparent from the following detailed description taken in conjunction with the accompanying drawings, in which:

FIGS. 4A and 4B are diagrams illustrating an example of an environment in which short-range communication is possible in the wireless communication system, according to an embodiment of the present invention;

DETAILED DESCRIPTION OF EMBODIMENTS OF THE PRESENT INVENTION

Hereinafter, embodiments of the present invention are described in detail with reference to the accompanying drawings. Those of ordinary skill in the art will recognize that various changes and modifications of the embodiments described herein can be made without departing from the scope of the present invention. In addition, descriptions of well-known functions and constructions may be omitted for clarity and conciseness. The same reference symbols are used throughout the drawings to refer to the same or like parts.

It should be noted that various embodiments described below may be applied or used individually or in combination.

Figure 1:
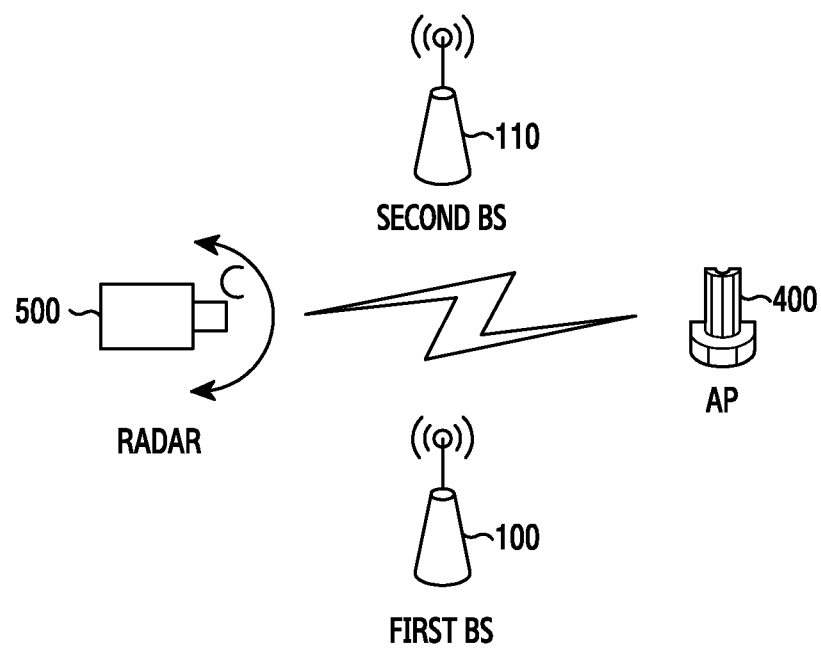
FIG. 1 is a diagram illustrating components of a wireless communication system, according to an embodiment of the present invention.

FIG. 1 is a diagram illustrating components of a wireless communication system, according to an embodiment of the present invention.

Referring to FIG. 1, a radar 500 is operable in an Industrial Scientific and Medical (ISM) band and an unlicensed band.

A first Base Station (BS) 100 and a second BS 110 communicate with a mobile station, and a cell constitutes a mobile communication system. The first and second BSs 100 and 110 may be BSs of an LTE-U system.

An Access Point (AP) 400 connects two or more personal computers (or User Equipments (UEs)) to the Internet, a printer, and other devices. The AP may be a wireless Local Area Network (LAN).

For illustrative purposes, it is assumed that the first and second BSs 100 and 110 and the AP 400 operate in a communication standard environment using an unlicensed band. For example, the communication standard may include the wireless standards LAN, LTE-A, and the like. Further, the first and second BSs 100 and 110 and the AP 400 may analyze mutual messages between different standards. The communication standard may perform communication between Listen Before Talk (LBT) and follow an ISM rule.

Figure 2:
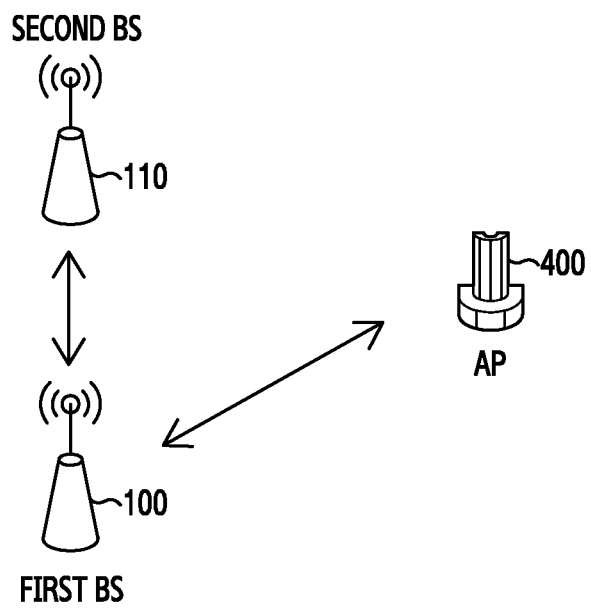
FIG. 2 is a diagram illustrating an interferer to which an interference control/avoidance technology can be applied and an interferer to which the interference control/avoidance technology cannot be applied in the wireless communication system, according to an embodiment of the present invention.

FIG. 2 is a diagram illustrating an interferer to which the first and second BSs 100, 110 can apply an interference control/avoidance technology and an interferer to which the first and second BSs cannot apply the interference control/avoidance technology in the wireless communication system, according to an embodiment of the present invention. As used herein, an interferer is a communication device that generates interference within a communication network.

Referring to FIG. 2, the second BS 110 corresponds to an interferer to which the interference control/avoidance technology can be applied based on the first BS 100. The interference control/avoidance technology may include Coordinated MultiPoint (CoMP) enhanced Inter-Cell Interference Coordinate (eICIC) technology. For example, the second BS 110 may be a BS to which the interference control/avoidance technology can be applied from among BSs of the same operator as that of the first BS 100. A communication medium between the first BS 100 and the second BS 110 may be an X2 interface or an LTE band.

The AP 400 is an interferer to which the interference control/avoidance technology cannot be applied. For example, the AP 400 may be one of the BSs to which the interference control/avoidance technology cannot be applied from among BSs of different operators from the operator of the first BS 100 and BSs of the same operator as that of the first BS 100.

Figures 3A, 3B:
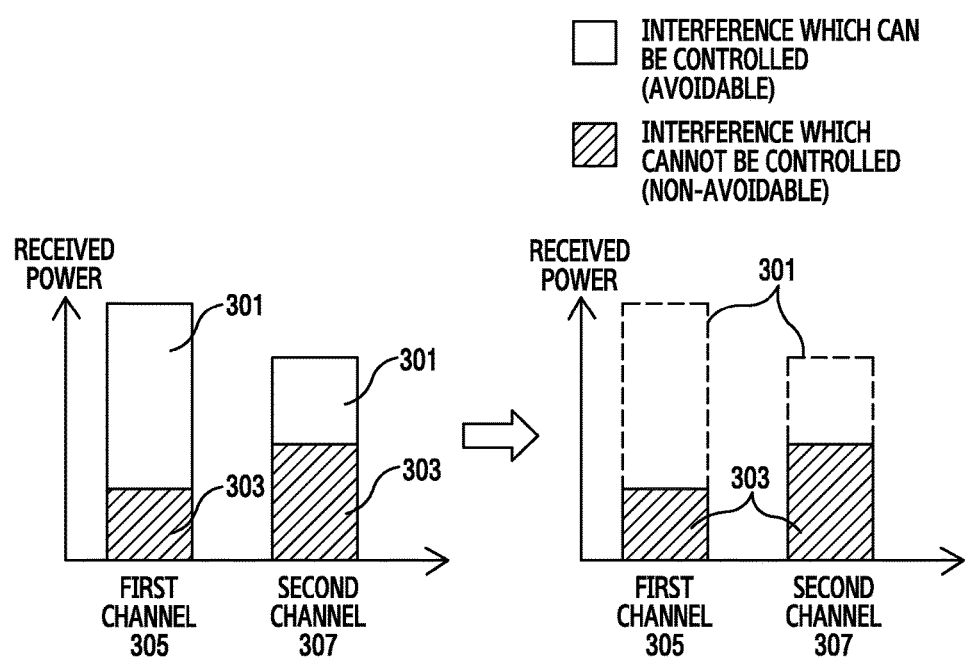
FIGS. 3A and 3B are graphs illustrating a channel having small interference changes through the application of the interference control/avoidance technology by BS in the wireless communication system, according to an embodiment of the present invention.

FIGS. 3A and 3B are graphs illustrating a channel having small interference changes through the application of the interference control/avoidance technology by the BS in the wireless communication system, according to an embodiment of the present invention.

Referring to FIG. 3A, each of a first channel 305 and a second channel 307 may include interference 301 which can be controlled and interference 303 which cannot be controlled. When an amount of interference is measured based on a size of received power of each of the first channel 305 and second channel 307, without considering whether interferers generating the interferences 301 and 303 can be controlled, the first channel 305 has a greater amount of interference than the second channel 307. However, when the interference can be avoided through the application of the interference control/avoidance technology to the interference signal of the interferer which can be controlled, an amount of interference relative to the first and second channels 305, 307 may change. For example, referring to FIG. 3B, when the interference signal which can be controlled is avoided through the application of the interference control/avoidance technology, the first channel 305 may be a channel having a smaller amount of interference than the second channel 307.

FIGS. 4A and 4B are diagrams illustrating an example of an environment in which short-range communication is possible in the wireless communication system, according to an embodiment of the present invention.

Referring to FIG. 4, while the first BS 100 receives a relatively large amount of interference 405 from the first AP 400, which is close to the first BS 100 in a first band 401, the second BS 110 receives a relatively small amount of interference 407 from the second AP 410, which has a distance between the second AP 410 that is longer than a distance between the first AP 400 and the first BS 100, in a second band 403.

In general, since it is assumed that the wireless LAN transmits maximum power, a threshold of transmission power is also set to be maximum power. That is, the wireless LAN measures a channel state only as a busy/idle state based on the threshold. Accordingly, wireless LANs cannot perform short-range communication with low power. However, communication devices to which LTE technology is applied can control power so that short-range communication can be performed without causing serious damage to the wireless LAN. Accordingly, in an environment generating a relatively small amount of interference 407, such as the second BS 110, a channel may be measured through more subdivided channel occupancy rate models.

Figure 5A:
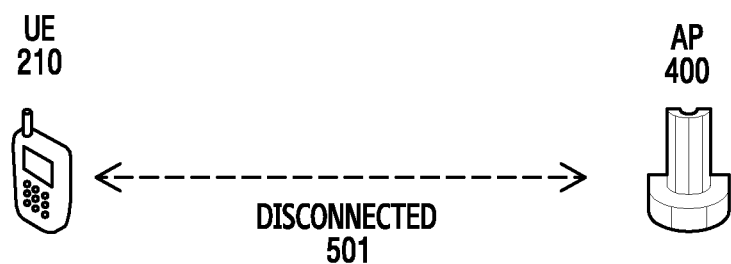
FIGS. 5A and 5B are diagrams illustrating a start state of channel selection in the wireless communication system, according to an embodiment of the present invention.
Figure 5B:

FIGS. 5A and 5B are diagrams illustrating a start state of channel selection in the wireless communication system, according to an embodiment of the present invention.

Referring to FIG. 5A, since the AP 400 starts the channel selection when the AP 400 starts an operation, a UE, at this time, is not able to access the AP 400. For example, a UE 210 cannot connect to the AP 400, as indicated by reference numeral 501. However, referring to FIG. 5B, since the BS 100 selects an ISM channel while the BS 100 operates, there may be at least one UE 200 that accesses the BS 100. Accordingly, the BS 100 may receive feedback information on channel preference for selecting the channel from at least one UE 200. The feedback information may include channel information corresponding to a least weighted value from among the sums of different weighted values assigned to channels of an interferer, e.g., the AP 400, which can be controlled by the UE, and channels of the interferer, which cannot be controlled by the UE. Accordingly, the BS 100 may select the channel having the smallest interference based on the feedback information.

Figure 6:
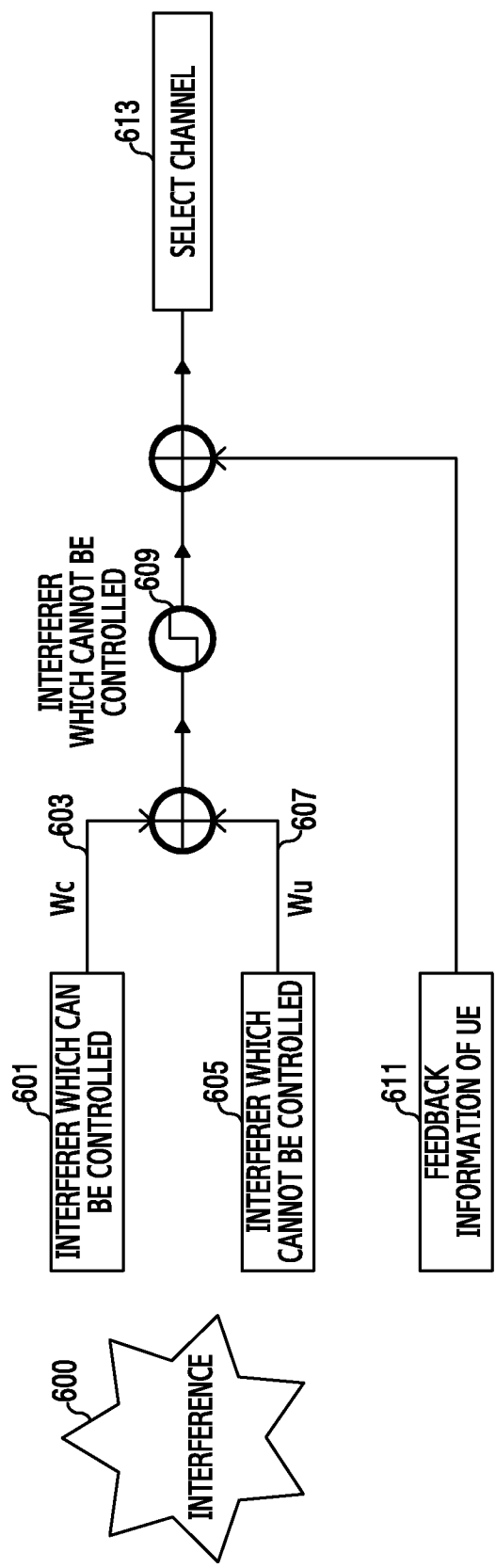
FIG. 6 is a diagram illustrating an example of a configuration for selecting a channel having small interference in the wireless communication system, according to an embodiment of the present invention.

FIG. 6 is a diagram illustrating an example of a configuration for selecting a channel having small interference in the wireless communication system, according to an embodiment of the present invention.

Referring to FIG. 6, interferers that cause interference 600 in the BS 100 may include an interferer 601 that can be controlled and an interferer 605 which cannot be controlled.

The BS 100 applies a weighted value "Wc" 603 to a channel occupancy rate of the interferer 601 and a weighted value "Wu" 607 to a channel occupancy rate of the interferer 605, calculates a least weighted value from among the sums of the channel occupancy rate of the interferer 601 and the channel occupancy rate of the interferer 605 according to each of the weighted values, and selects a channel having a smallest interference corresponding to the least weighted value. The "Wc" 603 and the "Wu" 607 may be determined through the interference control technology according to how many interference removal effects exist.

The BS 100 applies different thresholds according to reception power from another BS to divide levels of the amounts of interference according to the thresholds and calculates the channel occupancy rates as indicted by reference numeral 609. The BS 100 receives feedback information from a UE connected to the BS 100, as indicated by reference numeral 611. The BS 100 selects a channel based on the feedback information, as indicated by reference numeral 613. The feedback information includes channel occupancy rate information of interference measured by the UE, a preferred channel of the UE, and barred channel information.

Figure 7:
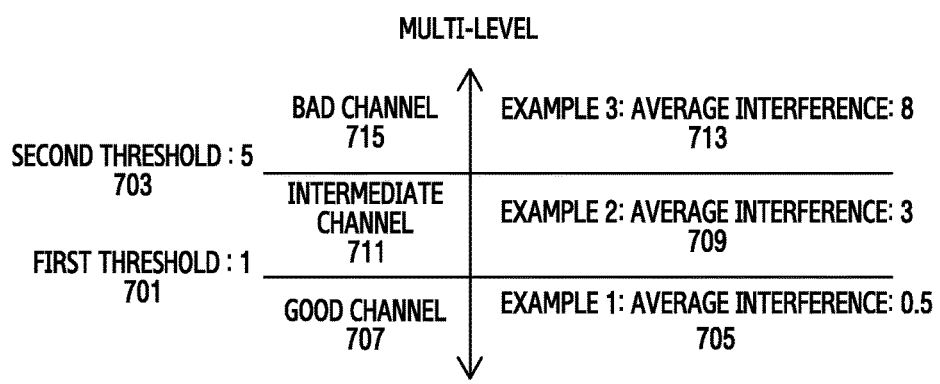
FIG. 7 is a diagram illustrating an example of a multi-level channel in the wireless communication system, according to an embodiment of the present invention.

FIG. 7 is a diagram illustrating an example of a multi-level channel in the wireless communication system, according to an embodiment of the present invention.

Referring to FIG. 7, channels 707, 711, and 715 are classified according to thresholds of reception power of the BS 100. For example, a channel having a value converted according to reception power, which is less than or equal to "1" corresponding to a first threshold 701, may be classified as a good channel 707, e.g., having an average interference of 0.5. A channel having a value converted according to reception power, which is between the first threshold 701 and a second threshold 703 may be classified as an intermediate channel 711, e.g., having an average interference of 3. A channel having a value converted according to reception power, which is greater than the second threshold 703 may be classified as a bad channel 715, e.g., having an average interference of 8.

When a channel having a value which is less than the first threshold 701, is measured through the channel measurement, the BS 100 selects the channel, which has a value which is less than the first threshold 701. When a channel, which is less than the first threshold 701, is not measured through the channel measurement, the BS 100 identifies whether there is a channel, which has a value which less than the second threshold 703. When there is the channel that has a value which is less than the second threshold 703, the BS 100 distinguishes between an interference signal which can be controlled and an interference signal which cannot be controlled in the channel that is less than the second threshold 703. The BS 100 calculates a first channel occupancy rate, which is the sum of the different weighted values assigned to the interference signal which can be controlled and the interference signal which cannot be controlled. The BS selects a channel having the least channel occupancy rate. When there is no channel having a valueless than the second threshold 703 through the channel measurement, the BS 100 selects a channel, which may acquire a least sum of the first channel occupancy rate calculated by the BS 100 and a second channel occupancy rate calculated by the UE 200, from the channels having a value greater than the second threshold 703.

Figure 8:
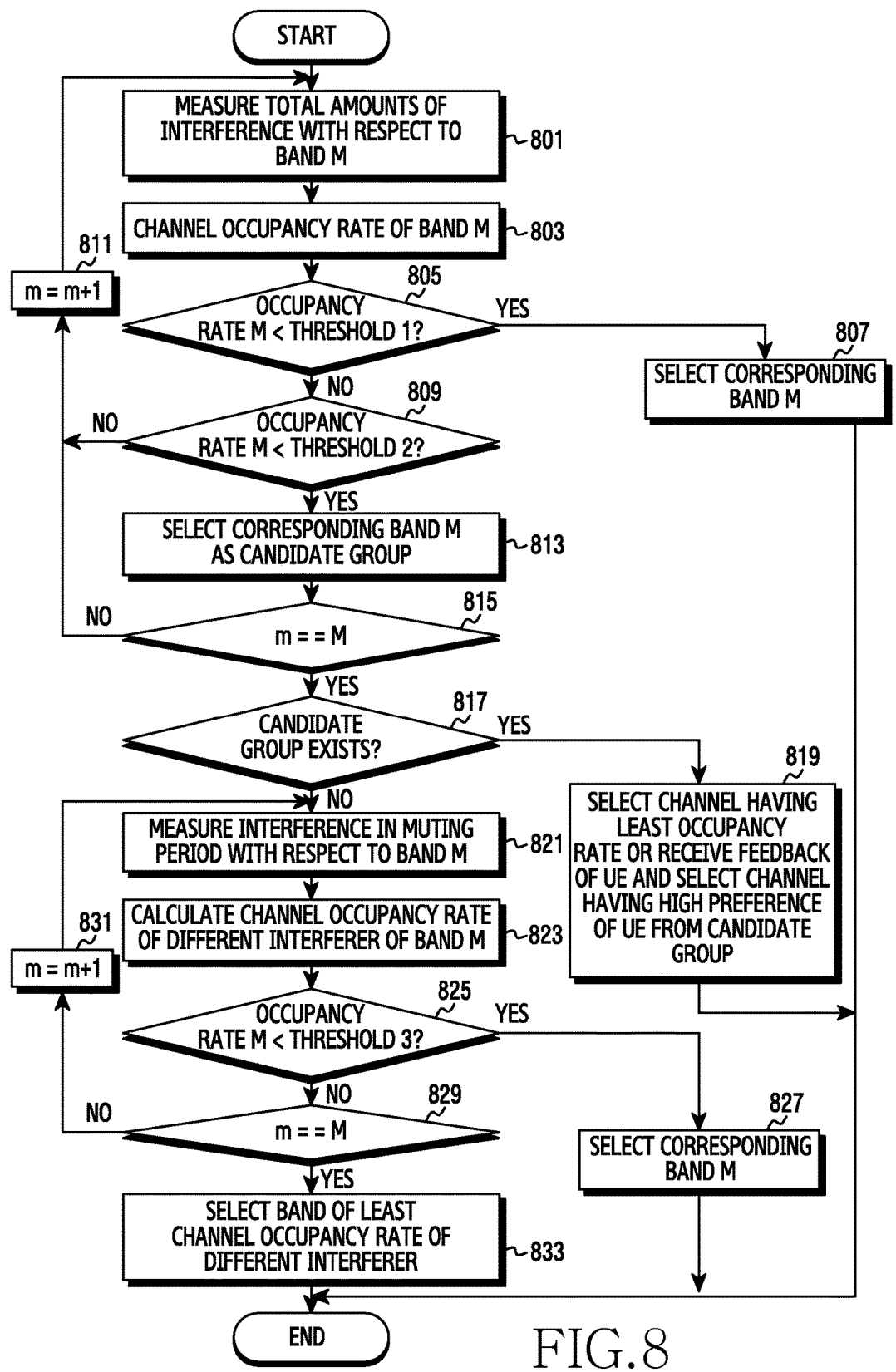
FIG. 8 is a flowchart illustrating a method in which the BS selects a channel in the wireless communication system, according to an embodiment of the present invention.

FIG. 8 is a flowchart illustrating a method in which a BS selects a channel in the wireless communication system, according to an embodiment of the present invention.

Referring to FIG. 8, the BS 100 measures a total amount of interference for band m at step 801. Band m is an $m^{th}$ band ($1 \leq m \leq M$) from among a total of M bands which can be measured by the BS 100. The BS 100 measures the total amount of interference through reception power measured in the band m.

The BS 100 calculates a channel occupancy rate of band m at step 803. The BS 100 calculates the channel occupancy rate of band m through the measured reception power of band m.

The BS 100 determines whether the channel occupancy rate (occupancy rate m) is less than a threshold 1 at step 805. When the channel occupancy rate is less than the threshold 1, the BS 100 selects band m at step 807. The BS 100 selects a band having a small channel occupancy rate, which was calculated. That is, the BS 100 selects the channel having a relatively small amount of interference, which belongs to a good group, when the channel is found.

When the channel occupancy rate (occupancy rate m) band m is not less than threshold 1, the BS 100 determines if the channel occupancy rate (occupancy rate m) of band m is less than threshold 2 at step 809. Threshold 2 is larger than threshold 1 (threshold 1<threshold 2). When the channel occupancy rate of band m (occupancy rate m) is less than threshold 2, the BS 100 selects band m as a candidate group at step 813. When the channel occupancy rate (occupancy rate m) of band m is greater than threshold 2, the BS 100 measures a total amount of interference for an $m+1^{th}$ band at steps 811 and 801.

When there is a band for which steps 801-813 are not performed, in all the M bands, the BS 100 measures the total amount of interference for the $m+1^{th}$ band at steps 811 and 801. When steps 801-813 are performed for all the M bands, the BS 100 identifies whether there is at least one candidate group band at step 817. When there is at least one candidate group band, the BS 100 selects a channel having the least channel occupancy rate from at least one candidate group band or selects a channel having the greatest UE preference according to feedback of the UE at step 819.

When at least one candidate group band does not exist, the BS 100 measures interference according to a muting period for at least one band m at step 821. The muting period is a period in which pre-appointed consecutive symbols for some channels used by the same operator BSs are empty, and the muting period is used to measure interference which cannot be controlled by the BS. For example, since the same operator BSs, which can be controlled, share the muting period, interference between the same operator BSs is not measured in the muting period. Accordingly, the BS determines the interference measured in the muting period as interference from a different interferer, which cannot be controlled by the BS.

The BS 100 calculates a channel occupancy rate of a different interferer of band m at step 823. The BS 100 calculates a channel occupancy rate of a different operator BS, which cannot be controlled, in the muting period or a channel occupancy rate of the wireless LAN.

The BS 100 determines whether the channel occupancy rate (occupancy rate m) of the different interferer is less than a threshold 3 at step 825. Threshold 3 is greater than threshold 2 (threshold 1<threshold 2<threshold 3). When the channel occupancy rate of the different interferer is less than threshold 3, the BS 100 selects a band including the channel of the different interferer at step 827.

The BS 100 determines whether the channel occupancy rate of the different interferer is calculated for a total of M bands at step 829. When it is determined that the channel occupancy rate of the different interferer is not completely calculated for a total of M bands, the BS 100 measures interference for the m+1$^{th}$ band in the muting period at steps 831 and 821.

When it is determined that the measurement is completely performed for a total of M bands, the BS 100 selects a band, which includes the least channel occupancy rate value from the channel occupancy rates of the different interferer, from the M bands at step 833.

Figure 9A:
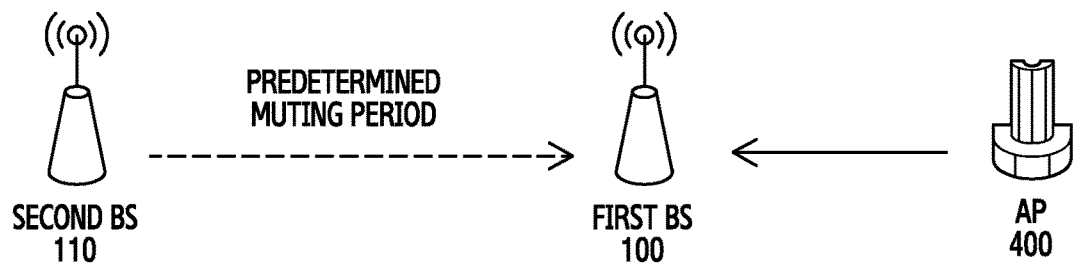
FIGS. 9A-9C are diagrams illustrating an example of a channel based on a muting period for identifying an interferer which can be controlled by the BS in the wireless communication system, according to an embodiment of the present invention.
Figure 9B:
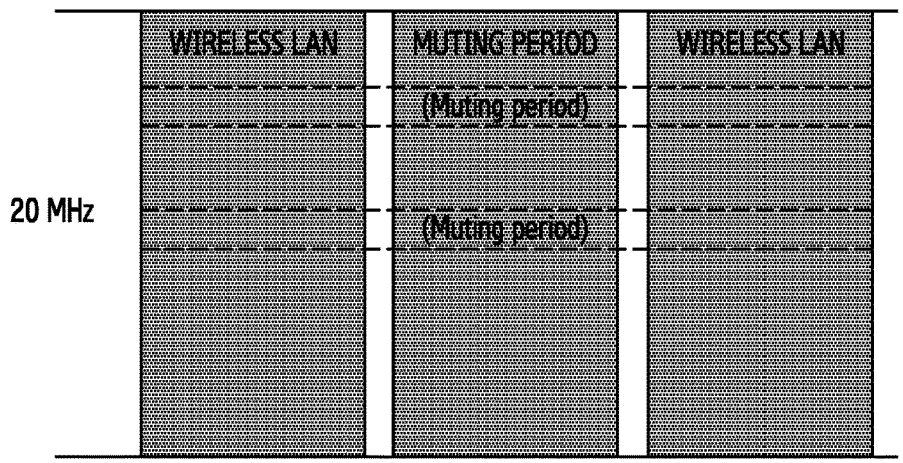
Figure 9C:
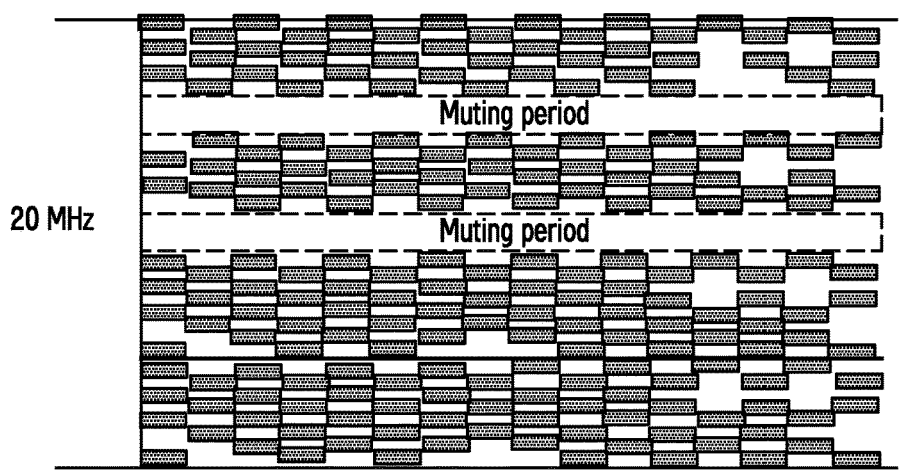

FIGS. 9A-9C are diagrams illustrating an example of a channel based on a muting period for identifying an interferer which can be controlled by the BS in the wireless communication system, according to an embodiment of the present invention.

Referring to FIG. 9A, the first BS 100 and the second BS 110 transmit muting period information from an OAM server. The muting period information includes the number of symbols, a start position, a resource position, and muting pattern information. It is assumed that the BSs 100 and 110 are LTE BSs and the AP 400 is the wireless LAN. The AP 400 selects channels in the unit of 20 MHz. However, the BSs 100 and 110 using an LTE technology select channels in the unit less than 20 MHz. For example, the BSs 100 and 110 use a Resource Block (RB) of the unit of 180 kHz and a Sing Carrier (SA) of the unit of 15 kHz. Accordingly, with respect to some channels of 20 MHz used by the BSs 100 and 110, the BSs 100 and 110 generate consecutive symbols based on the muting period through information on the muting signal and use the generated symbols for measuring an interferer, which cannot be controlled. For example, referring to FIG. 9C, the second BS 110 outputs a channel based on the muting period. Accordingly, the first BS 100 cannot measure an interference signal from the second BS 110 in a predetermined muting period. However, referring to FIG. 9B, the AP 400 outputs a signal regardless of the predetermined muting period. At this time, the first BS 100 determines the channel measured in the muting period as a channel of a communication device which cannot be controlled, that is, a channel of the AP 400. Further, the first BS 100 measures all of the interfering channels of the AP 400 which cannot be controlled and interfering channels of the second BS 110, which can be controlled, by measuring channels in other periods except for the muting period. Accordingly, the first BS 100 detects channels of the second BS 110 which can be controlled by calculating a difference between the channels measured in other periods except for the muting period and the channels measured in the muting period.

Figure 10:
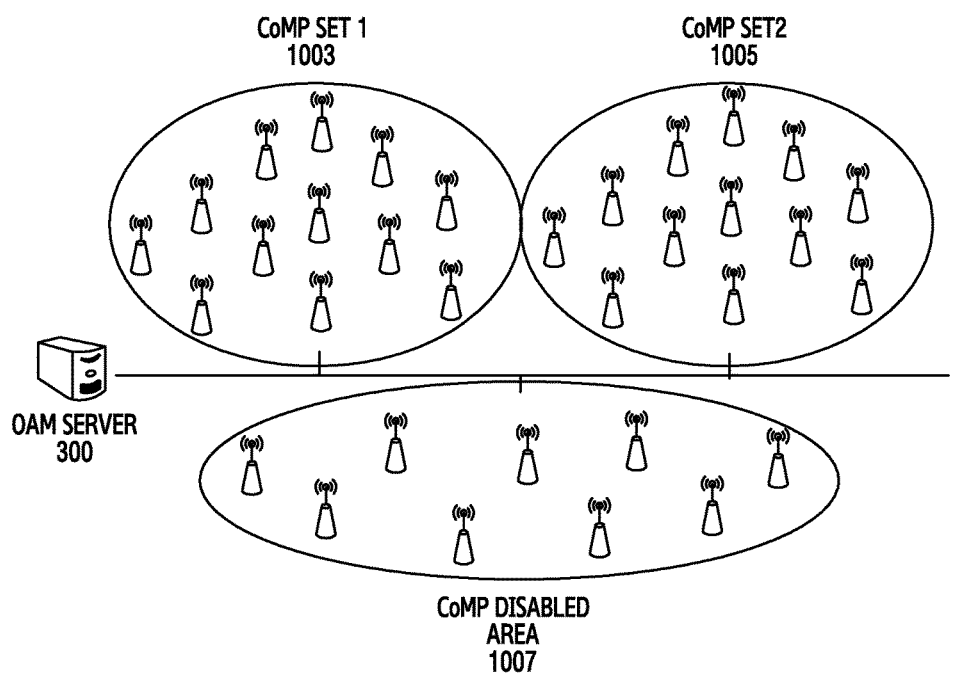
FIG. 10 is a diagram illustrating an example in which the BS acquires interference control information and muting pattern information in the wireless communication system, according to an embodiment of the present invention.

FIG. 10 is a diagram illustrating an example in which a BS acquires interference control information and muting pattern information in the wireless communication system, according to an embodiment of the present invention.

Referring to FIG. 10, a CoMP set #1 1003 and a CoMP set #2 1005 receive interference control information and muting period information from Operation Administration Maintenance (OAM) server 300. The interference control information includes CoMP set information and eICIC set information. The OAM server 300 is an element management system, which manages network elements and provides a function such as operation, administration, and maintenance of the network. BSs within the same CoMP set can manage interferers through the interference control information. However, in a CoMP-disabled area, the management of the interferers is not possible. The muting period information includes the number of symbols, a start position, a resource position, and muting pattern information.

Figure 11:
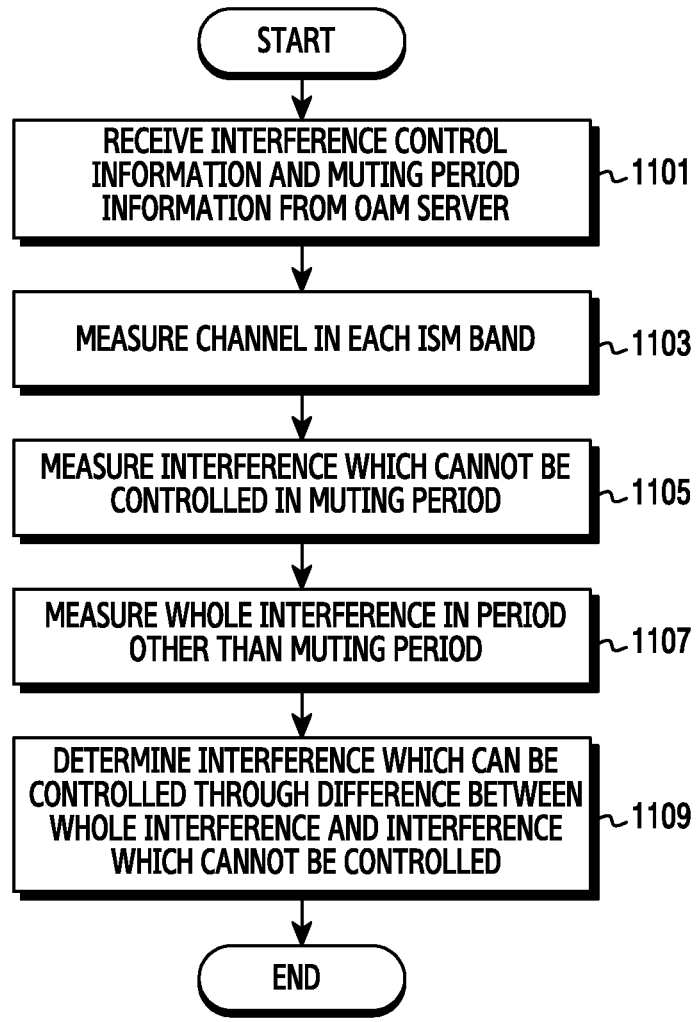
FIG. 11 is a flowchart illustrating a method in which the BS induces an interferer which can be controlled in the wireless communication system, according to an embodiment of the present invention.

FIG. 11 is a flowchart illustrating a method in which a BS induces an interferer which can be controlled in the wireless communication system, according to an embodiment of the present invention.

Referring to FIG. 11, the BS 100 receives interference control information and muting period information from the OAM server 300 at step 1101. The interference control information includes CoMP set information and eICIC set information. The muting period information includes the number of symbols, a start position, a resource position, and muting pattern information.

The BS 100 performs channel measurement in each ISM band at step 1103. The BS 100 measures channels of the same operator BSs which can be controlled in the ISM band, channels of the BS to which the interference control information is not applied from among the same operator BSs, channels of a different operator BS which cannot be controlled, and channels of an AR.

The BS 100 measures an interfering channel which cannot be controlled in the muting period at step 1105. A BS of the same operator as that of the BS 100 may output a signal based on the muting period. That is, the BS 100 may not measure an interference signal from the BS of the same operator in the muting period. Accordingly, the BS 100 determines the channel measured in the muting period as at least one of a BS to which the interference control technology is not applied from among the same operator BSs, a channel of a different operator BS, and a channel of an AP operating under a different communication technology. That is, the BS 100 determines the channel measured in the muting period as a channel of an interferer which cannot be controlled. For example, the BS of the same operator to which the interference control technology can be applied outputs a signal based on the muting period according to the muting period information received from the OAM server 300 in the muting period. That is, the BS 100 may not receive interference from the BS of the same operator to which the interference control technology can be applied in the muting period. However, since the BS 100 to which the interference control technology cannot be applied from among the same operator BSs, the BS of a different operator from that of the BS 100, and the AP operating under a different communication technology from that of the BS 100, cannot receive the muting period information, the signal may be output regardless of the muting period information. Accordingly, the BS 100 measures a channel in the muting period and determines the channel measured in the muting period as the channel of the interferer which cannot be controlled by the BS 100.

The BS measures interference in other periods except for the muting period at step 1107. The BS measures both the channel of the interferer which can be controlled and the channel of the interferer which cannot be controlled in other periods, except for the muting period. That is, the BS measures the channels of all interferers in other periods except for the muting period.

The BS determines the channels of the interferer which can be controlled through a difference between the channels of all interferers and the channels of the interferer which cannot be controlled at step 1109. The BS determines the channels of the interferer which can be controlled and the channels of the interferer which cannot be controlled by calculating the difference between all channels including the channels of the interferer which can be controlled and the channels of the interferer which cannot be controlled.

Figure 12:
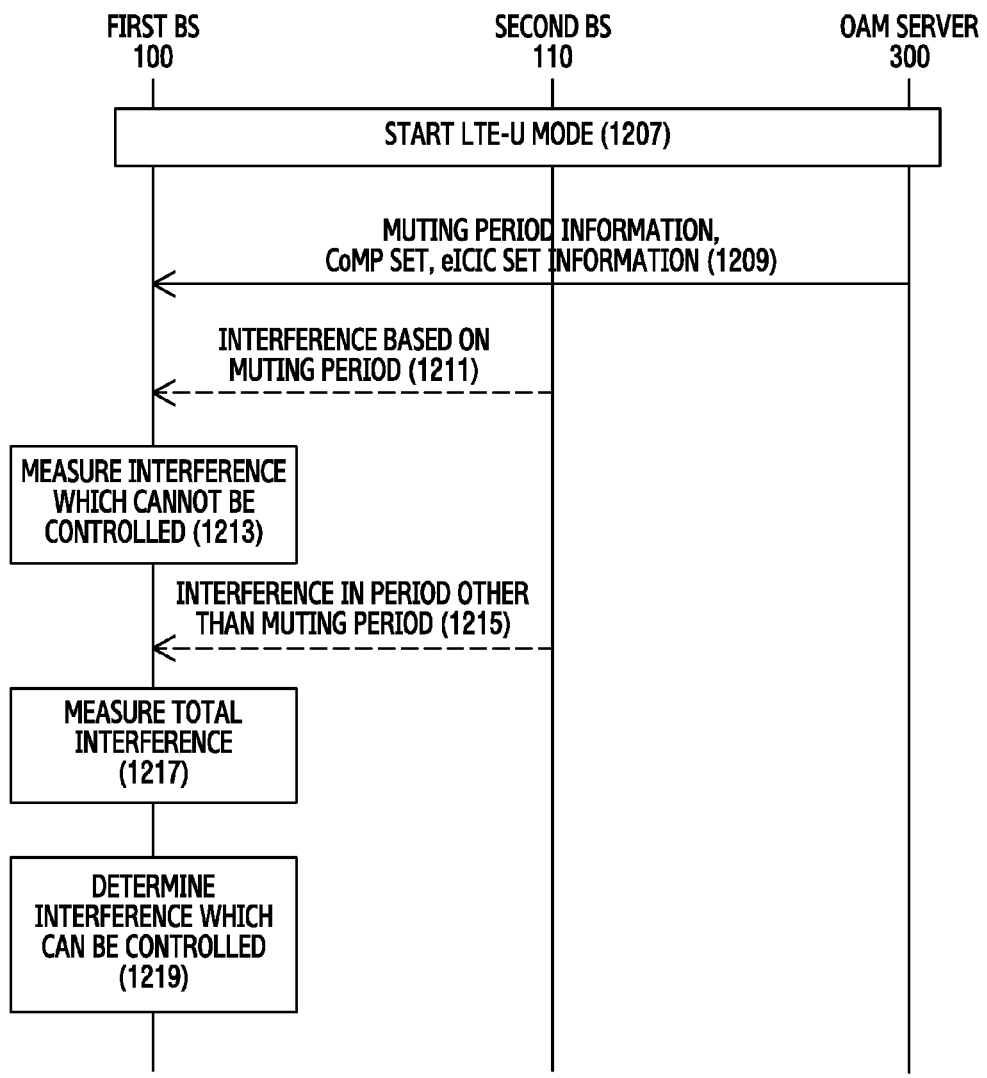
FIG. 12 is a diagram illustrating an example for a signal exchange for inducing an interferer which can be controlled through interference control information and muting period information by the BS in the wireless communication system, according to an embodiment of the present invention.

FIG. 12 is a diagram illustrating an example for a signal exchange for inducing an interferer which can be controlled through interference control information and muting period information by a BS in the wireless communication system, according to an embodiment of the present invention.

Referring to FIG. 12, after an LTE-U mode starts, at step 1207, the OAM server 300 transmits the interference control information and the muting period information to the first BS 100 and the second BS 110 at step 1209. The interference control information includes CoMP set information and eICIC set information. The muting period information includes the number of symbols, a start position, a resource position, and muting pattern information.

The second BS 110 outputs a signal based on muting period through the muting period information acquired through the OAM server 300 at step 1211. That is, the first BS 100 does not measure interference caused by the second BS 110 in the muting period. Accordingly, the first BS 100 may determine the channel measured in the muting period as an interfering channel from a communication device(s) which cannot be controlled at step 1213.

However, since the second BS 110 outputs a signal which is not based on the muting period in other periods which are not the muting period, the first BS 100 measures an interfering channel of the second BS 110 as well as an interfering channel from a communication device which cannot be controlled in other periods, which are not the muting period. That is, the first BS 100 measures all interfering channels in other periods which are not the muting period at step 1217. Accordingly, the first BS 100 determines an interfering channel of a communication device which can be controlled, through a difference between all the interfering channels and the interfering channel of the communication device which cannot be controlled.

Figure 13:
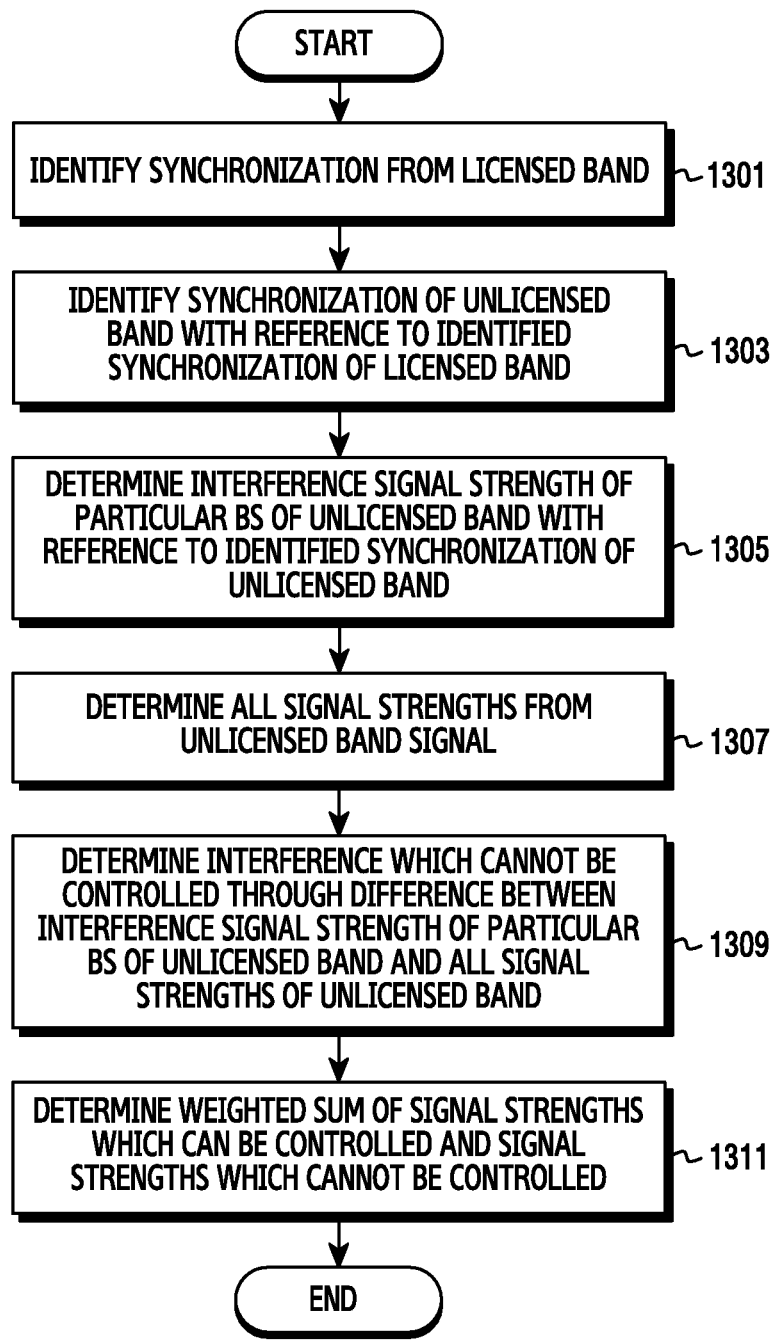
FIG. 13 is a flowchart illustrating a method in which the BS detects synchronization and identifies an interferer in the wireless communication system, according to an embodiment of the present invention.

FIG. 13 is a flowchart illustrating a method in which a BS detects synchronization and identifies an interferer in the wireless communication system, according to an embodiment of the present invention.

Referring to FIG. 13, the BS 100 identifies synchronization from a licensed band at step 1301. More particularly, the BS 100 detects frame synchronization with reference to a Primary Synchronization Signal (PSS) and a Secondary Synchronization Signal (SSS) which are synchronization control signals of the licensed band. The BS 100 identifies adjacent BSs from which synchronization can be detected in the licensed band. In order to increase the accuracy of a received signal of the BS 100, the BS 100 transmits/receives a signal to/from an adjacent UE during a Multimedia Broadcast Single Frequency Network (MBSFN) subframe period and may not transmit/receive a signal to/from the adjacent UE during the remaining subframe periods. Accordingly, the BS 100 receives signals from adjacent BSs during the remaining subframe periods and detects frame synchronization in the licensed band.

The BS 100 identifies synchronization of the unlicensed band with reference to the identified licensed band at step 1303. More particularly, the BS 100 identifies the synchronization of the unlicensed band with reference to the identified synchronization of the licensed band. That is, when acquiring the irregular channels of the unlicensed band, the BS 100 identifies the PSS and the SSS of the unlicensed band at a synchronization time that is the same as the synchronization time of the licensed band to identify whether the synchronizations are the same in order to reduce the synchronization detection time of the corresponding band. The BS 100 identifies information on BSs adjacent to the BS 100. Frame structure of the licensed band and the unlicensed band are the same as each other, and a frame synchronization position within a subframe of the licensed band is the same as a frame synchronization position within a subframe of the unlicensed band. Accordingly, the synchronization signal is detected at the frame synchronization position of the unlicensed band from the detected synchronization position of the licensed band.

The BS 100 determines interference signal strength of a particular BS in the unlicensed band with reference to the identified unlicensed band synchronization at step 1305. The BS 100 acquires a Reference Signal Received Power (RSRP) signal level through code detection of the corresponding BS contained in a Cell Specific Reference Signal (CRS).

The BS 100 determines all signal strengths from the unlicensed band signal at step 1307. All signals may include interference signals of ISM devices which cannot be controlled, such as wireless LAN devices, as well as identified BS information.

The BS 100 determines a total amount of interference which cannot be controlled, by using a difference between interference signal strength of a particular BS in the unlicensed band and all signal strengths in the unlicensed band at step 1309. More particularly, the BS 100 determines a total amount of interference which cannot be controlled, through the difference between the interference signal strength of the particular BS of the unlicensed band determined with reference to the identified unlicensed band synchronization and all the signal strengths derived from the signals of the unlicensed band.

The BS 100 determines the sum of weighted values of the signal strengths which can be controlled and the signal strengths which cannot be controlled at step 1311. More particularly, the BS 100 calculates the sum of weighted values generated by multiplying the signal strength which can be controlled and signal strength which cannot be controlled by the different weighted values.

The BS 100 performs steps 1301-1311 on all BSs detected at steps 1301-1303. The BS 100 acquires only the interference signal strength which cannot be controlled at step 1315.

The BS of the licensed band and the BS of the unlicensed band may be arranged in a co-located structure. The BS of the licensed band may include one Radio Unit (RU) and one Digital Unit (DU), and the BS of the unlicensed band may include one RU and a plurality of DUs connected to the one RU.

Figure 14:
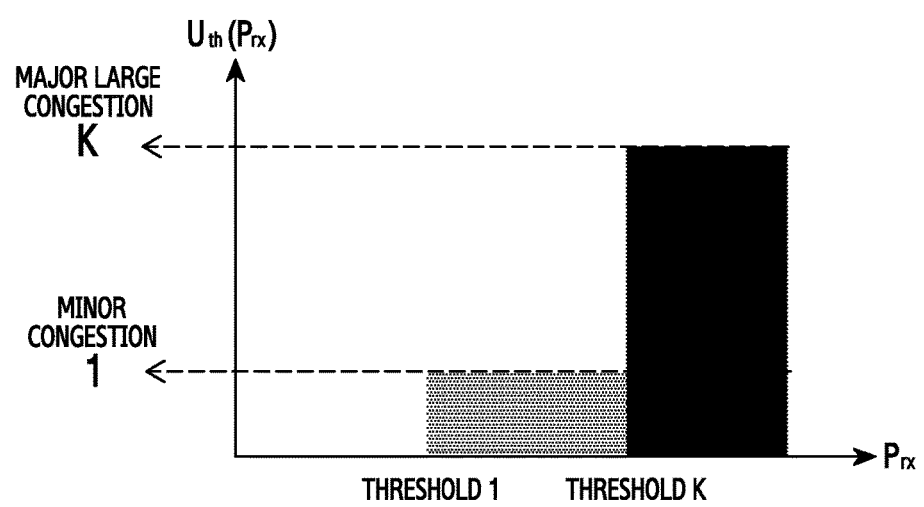
FIG. 14 is a diagram illustrating an example in which the BS measures a multi-level channel occupancy rate in the wireless communication system, according to an embodiment of the present invention.

FIG. 14 is a diagram illustrating an example in which a BS measures a multi-level channel occupancy rate in the wireless communication system, according to an embodiment of the present invention.

Referring to FIG. 14, an example of a value ($U_{th}(P_{rx})$) indicating a congestion level according to a threshold of reception power $P_{rx}$ is illustrated. For example, the value indicating the congestion level may be divided into a minor congestion level and a major congestion level. For example, when the reception power is greater than threshold 1 and is less than or equal to threshold k, the value indicating the congestion level may be included in a level 1 corresponding to the minor congestion level. Further, when the reception power is larger than threshold k, the value indicating the congestion level may be included in level k corresponding to the major congestion level.

The BS 100 induces the channel occupancy rate based on Equation (1).

$$COR = \sum_{t \in T} U_{th}(P_{rx,t}). \qquad (1)$$

Where $P_{rx,t}$ denotes reception power, $U_{th}(P_{rx,t})$ denotes the value indicating the congestion level according to the reception power, and COR denotes a Multi-Level Channel Occupancy Rate (ML-COR) according to the threshold. The multi-level channel occupancy rate may be subdivided into a plurality of levels according to the threshold.

When the BS 100 selects the channel through the multi-level channel occupancy rate, a good channel may be rapidly selected. Since a standard of the multi-level increases according to communication devices that attempt access to the BS 100, the BS 100 measures an amount of interference of the communication devices. Accordingly, the BS 100 selects a channel having a relatively small multi-level channel occupancy rate. That is, the BS 100 selects a channel having a relatively small amount of interference.

The BS 100 performs communication with low power through the multi-level channel occupancy rate. For example, while devices transmit with full power in a wireless LAN environment, a BS can control transmission power in an LTE-U environment. Accordingly, the BS 100 can communicate with low power.

When the BS 100 selects a channel in an environment having a relatively large amount of interference through the multi-level channel occupancy rate, the BS 100 may efficiently identify interferers. In addition, since the BS 100 identifies the interferers according to a condition without having to identify all of the interferers, time and power resources can be saved by the BS 100.

Figure 15:
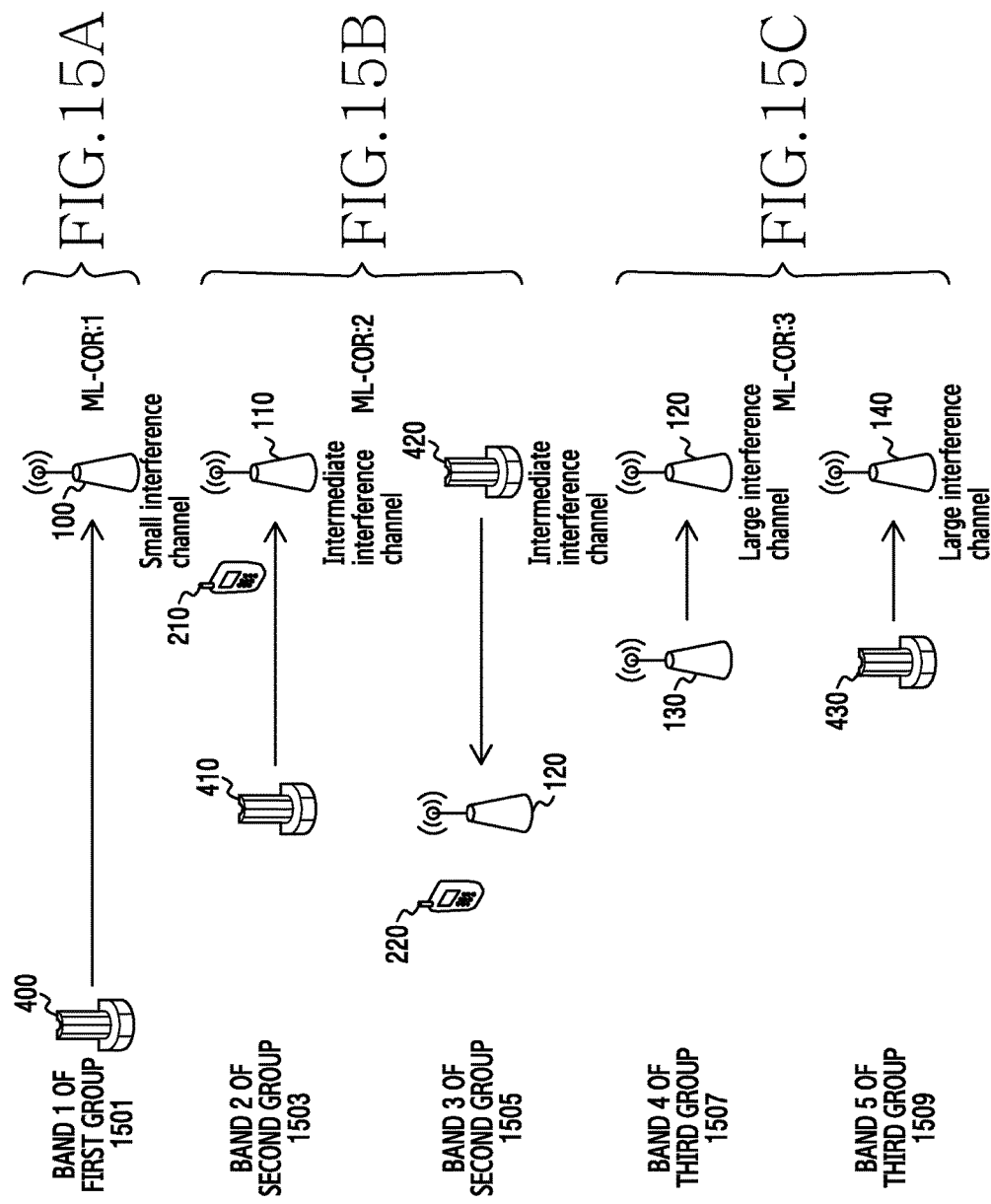
FIGS. 15A-15C are diagrams illustrating an example in which the BS selects a channel according to an interference environment in the wireless communication system, according to an embodiment of the present invention.

FIGS. 15A-15C are diagrams illustrating an example in which a BS selects a channel according to an interference environment in the wireless communication system, according to an embodiment of the present invention.

Referring to FIG. 15A, a multi-level channel occupancy rate (ML-COR) of band #1 1501 of a first group is 1, so that band #1 1501 may be classified as a channel having a relatively small amount interference. Accordingly, the BS 100 selects band #1 1501 of the first group.

Referring to FIG. 15B, band #2 1503 and band #3 1505 of a second group may have a multi-level channel occupancy rate of 2, so as to be classified as channels having a relatively intermediate amount of interference. At this time, the BS 100 selects a band having a minimum channel occupancy rate according to feedback information of the UE 200. For example, the BS 100 receives feedback information from the UE 200 and selects the channel according to the feedback information.

Referring to FIG. 15C, band #4 1507 and band #5 1509 of a third group may have a multi-level channel occupancy rate of 3, so as to be classified as channels having a relatively large amount of interference. At this time, the BS 100 determines an interference signal of an interferer of each channel and selects a channel based on the determination. The BS 100 selects a channel based on whether the interferer outputting the interference signal in each of the channels is an interferer which can be controlled or an interferer which cannot be controlled. For example, the BS 100 determines the sum of weighted values generated by multiplying the interference signal of the interferer which can be controlled and the interference signal of the interferer which cannot be controlled, by different weighted values in each of the channels. The BS 100 selects a channel corresponding to the least weighted value among the sums of the weighted values generated by multiplying the interference signal which can be controlled and the interference signal which cannot be controlled by different weighted values. That is, the BS 100 selects a channel having the least amount of interference.

Figure 16:
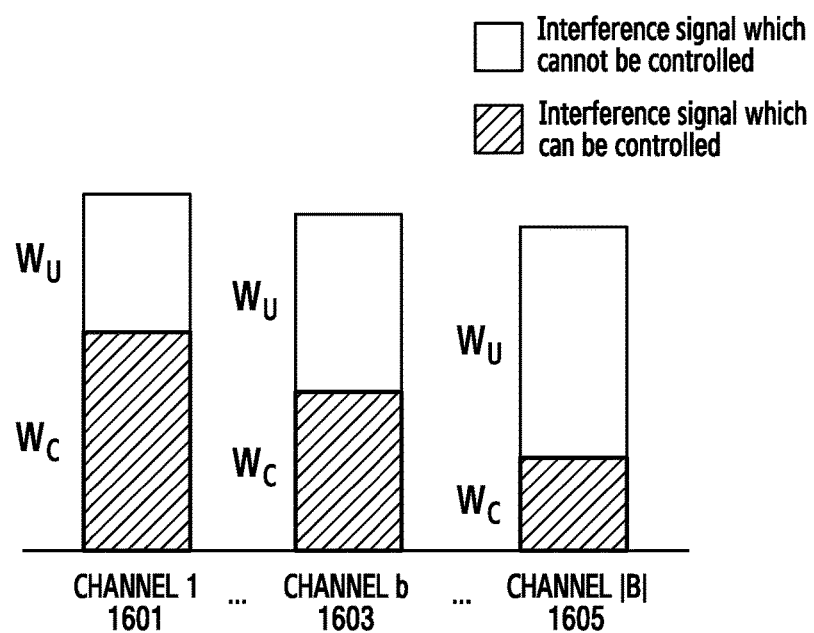
FIG. 16 is a graph illustrating an example in which the BS calculates channel occupancy rates by applying different weighted values based on the type of interferers in the wireless communication system, according to an embodiment of the present invention.

FIG. 16 is a graph illustrating an example in which a BS calculates channel occupancy rates by applying different weighted values based on the type of interferers in the wireless communication system, according to an embodiment of the present invention.

Referring to FIG. 16, the BS 100 multiplies a channel occupancy rate of an interferer which can be controlled and a channel occupancy rate of an interferer which cannot be controlled by different weighted values. The BS 100 determines a band of the channel occupancy rate having the least interference by applying different weighted values according to the channel occupancy rate of the interferer which can be controlled and the channel occupancy rate of the interferer which cannot be controlled using Equation (2):

$$b^* = \underset{b}{\mathrm{argmin}}\{w_C \cdot COR_{C,b} + w_U \cdot COR_{U,b}\},\ \forall\, b \in B,\ w_C < w_U, \qquad (2)$$

where b denotes an index of each ISM band, B denotes a set of whole ISM bands, wc denotes a weighted value for a channel occupancy rate of communication devices which can be controlled, CORC denotes a channel occupancy rate of communication devices which can be controlled, wu denotes a weighted value for a channel occupancy rate of communication devices which cannot be controlled, and CORU denotes a channel occupancy rate of communication devices which cannot be controlled. The weighted values wc and wu are predefined values and may be determined according to how many interference removal/avoidance effects exist through the interference control/avoidance technology. b* denotes a band having the smallest value from among the sums of the weighted values generated by multiplying the channel occupancy rate of the communication devices which can be controlled by the weighted value wc and the channel occupancy rate of the communication devices which cannot be controlled by the weighted value wu, that is, a band having the least amount of interference.

Figure 17:
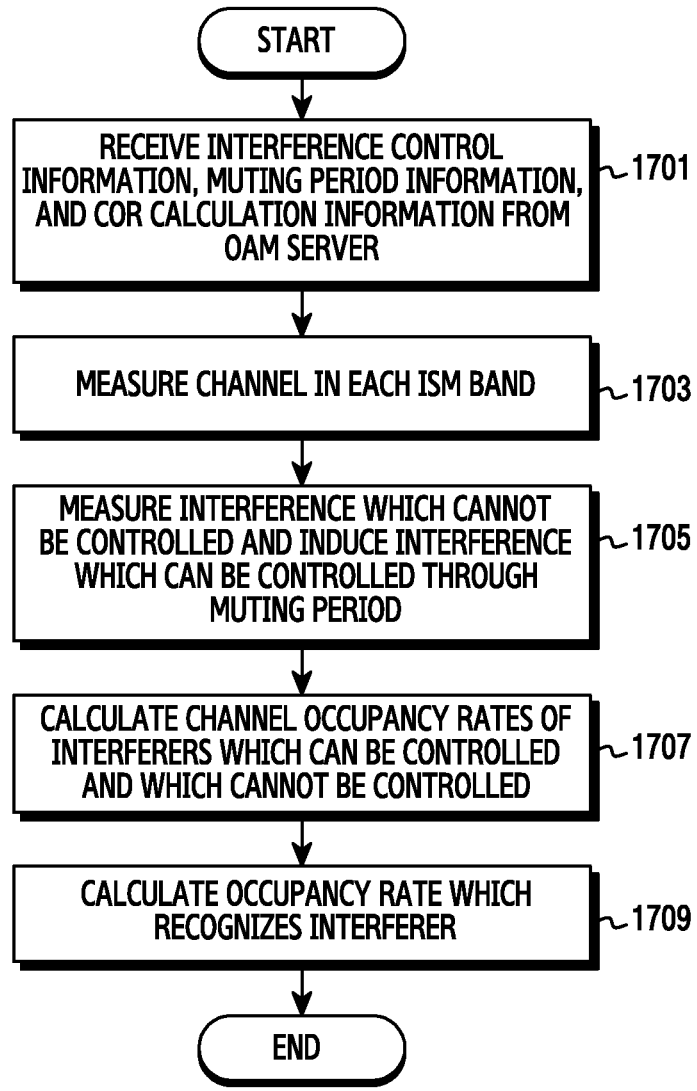
FIG. 17 is a flowchart illustrating a method in which the BS calculates channel occupancy rates by assigning different weighted values based on the type of interferers in the wireless communication system, according to an embodiment of the present invention.

FIG. 17 is a flowchart illustrating a method in which a BS calculates channel occupancy rates by assigning different weighted values based on the type of interferers in the wireless communication system, according to an embodiment of the present invention.

Referring to FIG. 17, the BS 100 receives interference control information, muting period information, and COR calculation information from the OAM server 300 at step 1701. The interference control information includes CoMP set information and eICIC set information. The muting period information includes a number of symbols, a start position, a resource position, and muting pattern information. The COR calculation information corresponds to information for calculating the channel occupancy rate. The COR calculation information includes a COR model and weighted value information.

The BS 100 measures channels in each ISM band at step 1703. The BS 100 measures the channels by measuring reception power in each ISM band. The channels are measured, in certain instances, prior to the BS 100 having already performed lower power control through interference control. When a change in the measured reception power is less than or equal to a particular level, the channel measurement step may be omitted. When BSs adjacent to the BS 100 transmit signals with low power, interference to the BS is relatively small. When interference from the interferer, which cannot be controlled, does not increase, the change in the reception power will be less than or equal to the particular level. Information on whether to perform the power control may be received from the OAM server 300 by the BS or may be shared between the BSs by using signaling between the BSs.

The BS 100 measures the channel of the interferer which cannot be controlled through muting period information and induces the channel of the interferer which can be controlled at step 1705. The BS 100 measures the channel of the interferer, which cannot be controlled, through the muting period information received from the OAM server 300. For example, since the BS 100, having received the muting pattern information from the OAM server 300, generates a signal based on the muting period information, the interference signal may not be measured from the BS 100 having received the muting period information from the OAM server 300 in the muting period. In other words, the BS 100 determines the interfering channel measured during the muting period as a channel of the BS or AP having not received the muting period information, that is, an interfering channel from the BS or AP which cannot be controlled. Meanwhile, when the interference from the BS or AP, which cannot be controlled, with respect to a particular channel is less than or equal to a particular reference value, the BS 100 selects the particular channel, without performing step 1705. Since the interference from the BS or AP, which cannot be controlled, can be predicted better than the interference from the BS, which can be controlled, if the interference is less than or equal to the particular reference value, the particular channel can be shared. Based on a reciprocity principle, interference with respect to the BS or AP, which cannot be controlled, due to the signal from the BS 100 may be less than or equal to the particular reference value. When the adjacent BSs do not perform low power control or the change in the measured reception power is greater than or equal to the particular level, the aforementioned steps not performed.

When the interference is greater than or equal to the particular reference value, the following steps are performed. The BS 100 measures both the channel of the interferer which can be controlled and the channel of the interferer which cannot be controlled, by measuring the channel during a period other than the muting period. The BS 100 determines the interfering channel of the interferer which can be controlled, through a difference between all of the interfering channels measured in the period, other than the muting period, and the interfering channel of the interferer which cannot be controlled, measured in the muting period.

The BS 100 calculates channel occupancy rates of the interferer which can be controlled and the interferer which cannot be controlled at step 1707. The BS 100 calculates channel occupancy rates of the interferer which can be controlled and the interferer which cannot be controlled, by measuring reception power of the interferer which cannot be controlled and reception power of the interferer which cannot be controlled, through the COR calculation information.

The BS 100 calculates a channel occupancy rate which recognizes the interferer at step 1709. The BS 100 assigns different weighted values to the channel occupancy rate of the interferer which can be controlled and the channel occupancy rate of the interferer which cannot be controlled through the COR calculation information, and calculates a least weighted value from among the channel occupancy rates of the interferer which can be controlled and the channel occupancy rates of the interferer which cannot be controlled. The BS 100 selects a channel having a least amount of interference through a weighted value.

Figure 18:
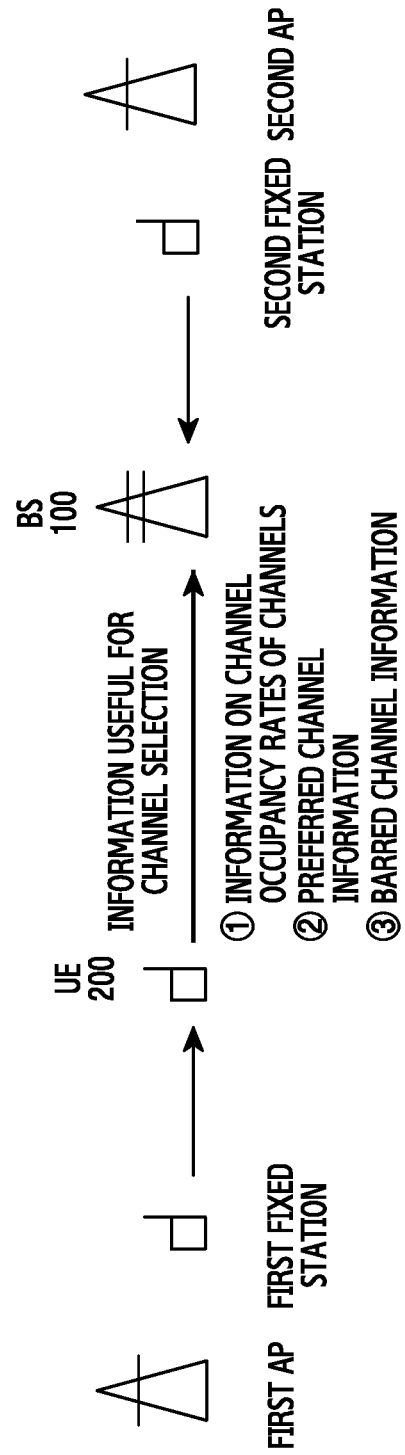
FIG. 18 is a diagram illustrating an example in which the BS selects a channel according to feedback information from a UE in the wireless communication system, according to an embodiment of the present invention.

FIG. 18 is a diagram illustrating an example in which a BS selects a channel according to feedback information from the UE in the wireless communication system, according to an embodiment of the present invention.

Referring to FIG. 18, the BS 100 receives feedback information from at least one UE 200. The feedback information includes channel occupancy rates of channels, preferred channel information, and barred channel information. The BS 100 selects a channel based on the feedback information. The BS 100 selects a channel based on Equation (3) below, not based on the feedback information.

$$b^* = \arg\min_b \{SCOR_{eNB,b}\}, \forall b \in B \quad (3)$$

$$SCOR_b = w_C \cdot COR_{C,b} + w_U \cdot COR_{U,b}.$$

In Equation (3), b denotes an index of each ISM band. B denotes a set of whole ISM bands, wc denotes a weighted value for an interferer which can be controlled, $COR_{C,b}$ denotes a channel occupancy rate of the interferer which can be controlled in the b channel index, wc denotes a weighted value for an interferer which cannot be controlled, and $COR_{U,b}$ denotes a channel occupancy rate of the interferer which cannot be controlled in the b channel index. The weighted values wc and wu are predefined values and may be determined according to how many interference removal effects exist through the interference control/avoidance technology. b* denotes a band having the least weighted value among the sums of the weighted values generated by multiplying the channel occupancy rate of the interferer which can be controlled by the weighted value wc and the channel occupancy rate of the interferer which cannot be controlled by the weighted value wu, that is, a band having least amount of interference. The BS 100 selects the channel having the least amount of interference, regardless of the feedback information from at least one UE 200 based on Equation (3) above.

The BS 100 selects the channel having the least amount of interference according to the feedback information based on Equation (4):

$$b^* = \arg\min_b \{w_{eNB} \cdot SCOR_{eNB,b} + w_{UE} \cdot \sum_{m \in M} SCOR_{m,b}\}, \forall b \in B. \quad (4)$$

In Equation (4), b denotes an index of each ISM band, B denotes a set of whole ISM bands, $SCOR_{eNB,b}$ denotes the sum of the different weighted values assigned to the channel occupancy rate of the interference signal which can be controlled and the channel occupancy rate of the interference signal which cannot be controlled, which are measured in one or more bands from among the B band set, by the BS 100, $W_{eNB}$ denotes a weighted value, which is assigned to the sum of the channel occupancy rate of the interference signal which can be controlled and the channel occupancy rate of the interference signal which cannot be controlled, which are measured by the BS 100, $SCOR_{m,b}$ denotes the sum of the different weighted values assigned to the channel occupancy rate of the interference signal which can be controlled and the channel occupancy rate of the interference signal which cannot be controlled, which are measured in one or more bands among the B band set, by the UE 200, and $w_{UE}$ denotes a weighted value assigned to $SCOR_{m,b}$. The weighted values $W_{eNB}$ and $w_{UE}$ are predefined values and may be determined according to how many interference removal effects exist through the interference control technology, and m denotes an index of the UE 200 and M denotes a set of UEs within a Base Station System (BSS).

When a difference between a sum of the channel occupancy rates of the channel having the least amount of the channel occupancy rate and channel occupancy rates of a channel having the next least amount of the channel occupancy rate is larger than a particular threshold based on Equation (5) below, the BS 100 selects a channel, which is not based on feedback information from the at least one UE 200. However, when the difference is not greater than the particular threshold, the BS 100 selects the channel based on the feedback information from the at least one UE 200 (at step 1913 of FIG. 19).

$$\text{If } SCOR_{eNB,b^{**}} - SCOR_{eNB,b^*} > \Delta SCOR, \quad (5)$$

$$\text{Then, } b^* = \underset{b}{\mathrm{argmin}}\{w_{eNB} \cdot SCOR_{eNB,b}\}, \forall b \in B$$

Otherwise, $$b^* = \underset{b}{\mathrm{argmin}}\{w_{eNB} \cdot SCOR_{eNB,b} + w_{UE} \cdot \sum_{m \in M} SCOR_{m,b}\}, \forall b \in B,$$

where $SCOR_{eNB,b^*}$ denotes a channel occupancy rate having the least amount of interference calculated by the BS 100, $SCOR_{eNB,b^{}}$ denotes a channel occupancy rate having the next least amount of interference calculated by the BS 100, and $\Delta SCOR$ denotes a threshold for determining whether to select a channel according to feedback information from the at least one UE 200 by the BS 100. The BS 100 determines whether the difference between the channel occupancy rate having the least amount of interference and the channel occupancy rate having the next least amount of interference is larger than the threshold $\Delta SCOR$. When the difference is greater than the threshold, the BS 100 selects a channel which may acquire the channel occupancy rate having the least amount of interference. For example, when $SCOR_{eNB,b^{}}$ is 11, $SCOR_{eNB,b^*}$ is 7, and $\Delta SCOR$ is 3, the condition of Equation (5) is met (11−7>3), so that the BS 100 selects the channel, which is not based on the feedback information from the at least one UE 200.

However, when the difference is not greater than the particular threshold, the BS 100 selects the channel based on the feedback information from the at least one UE 200. For example, when is $SCOR_{eNB,b^{**}}$ 8, $SCOR_{eNB,b^*}$ is 7, and $\Delta SCOR$ is 3, the condition of Equation (5) is not met, so that the BS 100 selects the channel based on the feedback information from the at least one UE 200. For example, the BS 100 selects the channel which may acquire a least weighted value among the sums generated by adding the sum of the different weighted values assigned to the channel occupancy rate of the interference signal, which can be controlled by the BS 100, and the channel occupancy rate of the interference signal, which cannot be controlled by the BS 100 in one or more channels of the B band set, and the sum of the different weighted values assigned to the channel occupancy rate of the interference signal which can be controlled by the at least one UE 200 and the channel occupancy rate of the interference signal which cannot be controlled by the at least one UE 200.

The BS 100 selects a channel according to whether the wireless LAN congested area of the UE 200 exists, a Channel Quality Indicator (CQI) of the UE 200, a degree of mobility of the UE 200, and whether the UE 200 requires high Quality of Experience (QoE).

Figure 19:
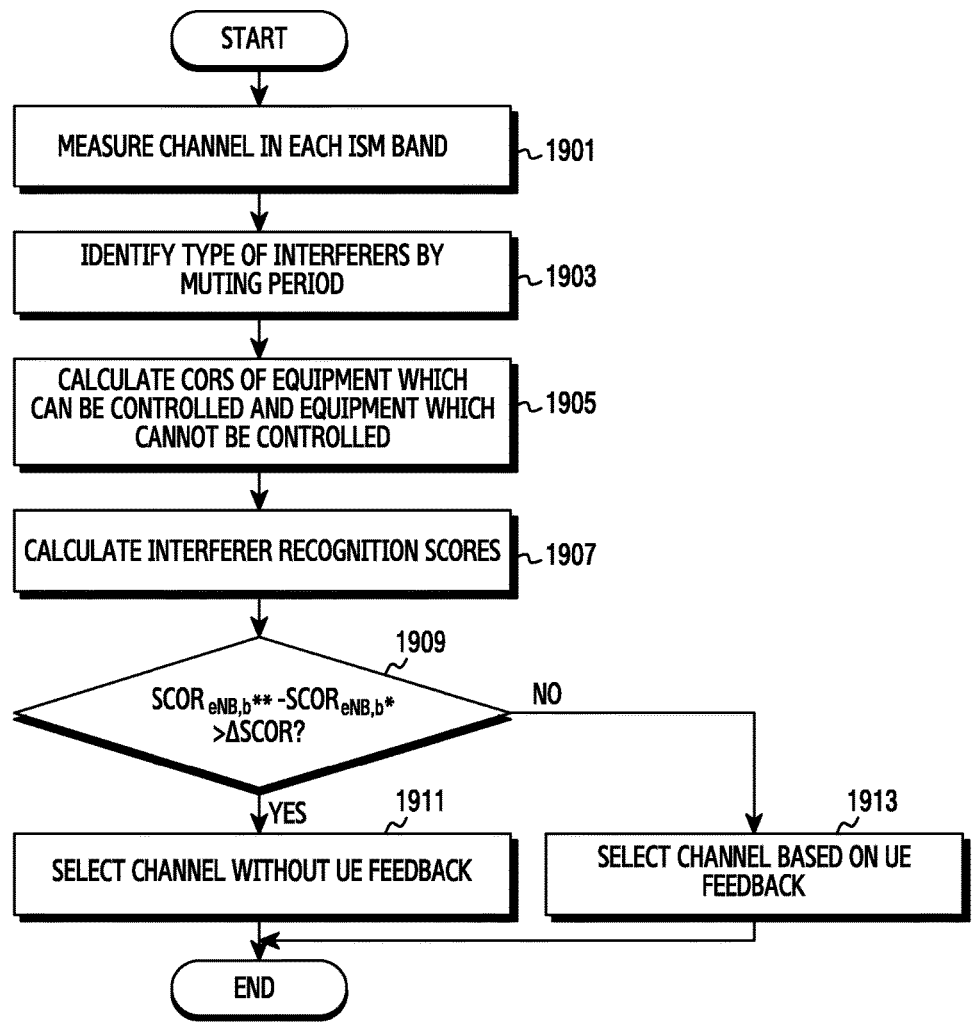
FIG. 19 is a flowchart illustrating a method in which the BS selects a channel according to feedback information from the UE in the wireless communication system, according to an embodiment of the present invention.

FIG. 19 is a flowchart illustrating a method in which a BS selects a channel according to feedback information from the UE in the wireless communication system, according to an embodiment of the present invention.

Referring to FIG. 19, the BS 100 measures a channel in each ISM band at step 1901. The BS 100 receives interference control information, muting period information, and COR calculation information from the OAM server 300 and measures the channel. The interference control information includes CoMP set information and eICIC set information. The muting period information includes a number of symbols, a start position, a resource position, and muting pattern information. The COR calculation information corresponds to information for calculating the channel occupancy rate. The COR calculation information includes a COR model and weighted value information. The BS 100 measures interference of the channel according to the size of reception power. Further, BSs to which the interference control technology can be applied from among the BSs operated by the same operator as that of the BS 100 receives the interference control information, the muting period information, and the COR calculation information from the OAM server 300.

The BS 100 identifies the type of interferers by the signal based on the muting period information at step 1903. The BS to which the interference control technology can be applied outputs the signal based on the muting period information received from the OAM server 300. That is, the BS 100 may not receive interference from the BS to which the interference control technology can be applied in the muting period. Accordingly, the BS 100 determines the interfering channel measured in the muting period as an interfering channel from a BS which cannot receive the muting period information from the OAM server 300, that is, a BS which cannot be controlled by the BS 100 or communication devices that operate using a communication technology different from that of the BS 100. Further, the BS 100 measures interfering channels from the BS which can be controlled in a period other than the muting period, the BS which cannot be controlled, and communication devices that operate using a communication technology different from that of the BS 100. That is, the BS 100 measures whole interfering channels in the period other than the muting period. Accordingly, the BS 100 determines the interfering channel which can be controlled, through a difference between interfering channels measured in the period other than the muting period and the interfering channel which cannot be controlled in the muting period.

The BS 100 calculates channel occupancy rates of the communication devices which can be controlled and the communication devices which cannot be controlled at step 1905. The BS 100 calculates channel occupancy rates of the communication devices which can be controlled and the communication devices which cannot be controlled according to Equation (1). The channel occupancy rate may be subdivided into a plurality of states according to a threshold based on the size of reception power from the communication devices which can be controlled and the communication devices which cannot be controlled.

The BS 100 recognizes the type of interferes and calculates channel occupancy rates through assigned weighted values according to the type of interferers at step 1907. The BS 100 calculates a least weighted value among the sums of the different weighted values assigned to the channel occupancy rates of the communication devices which can be controlled and the communication devices which cannot be controlled.

After receiving the feedback information from at least one UE 200, the BS 100 determines whether to select the channel according to the feedback information at step 1909. For example, the BS 100 determines whether to use the feedback information from at least one UE 200 by comparing the difference between channel occupancy rates of two channels having the least interference calculated by the BS 100. More particularly, the BS 100 determines whether the difference between the channel occupancy rate having the least interference and the channel occupancy rate having the next least interference is greater than a particular threshold.

When the difference is greater than the particular threshold, the BS 100 selects the channel, which is not based on the feedback information from at least one UE 200 at step 1911. For example, the BS 100 selects a channel which may acquire a least weighted value among the sums of the different weighted values assigned to the channel occupancy rate of the interference signal which can be controlled by the BS 100 and the channel occupancy rate of the interference signal which cannot be controlled by the BS 100.

However, when the difference is not greater than the particular threshold, the BS 100 selects the channel based on the feedback information from at least one UE 200 at step 1913. For example, the BS 100 selects a channel having a least weighted value among the sums generated by adding the sum of the different weighted values assigned to the channel occupancy rate of the interference signal which can be controlled by the BS 100 and the channel occupancy rate of the interference signal which cannot be controlled by the BS 100 in one or more channels and the sum of the different weighted values assigned, by at least one UE 200, to the channel occupancy rate of the interference signal which can be controlled by the at least one UE 200 and the channel occupancy rate of the interference signal which cannot be controlled by the at least one UE 200 in the one or more channels.

Figure 20:
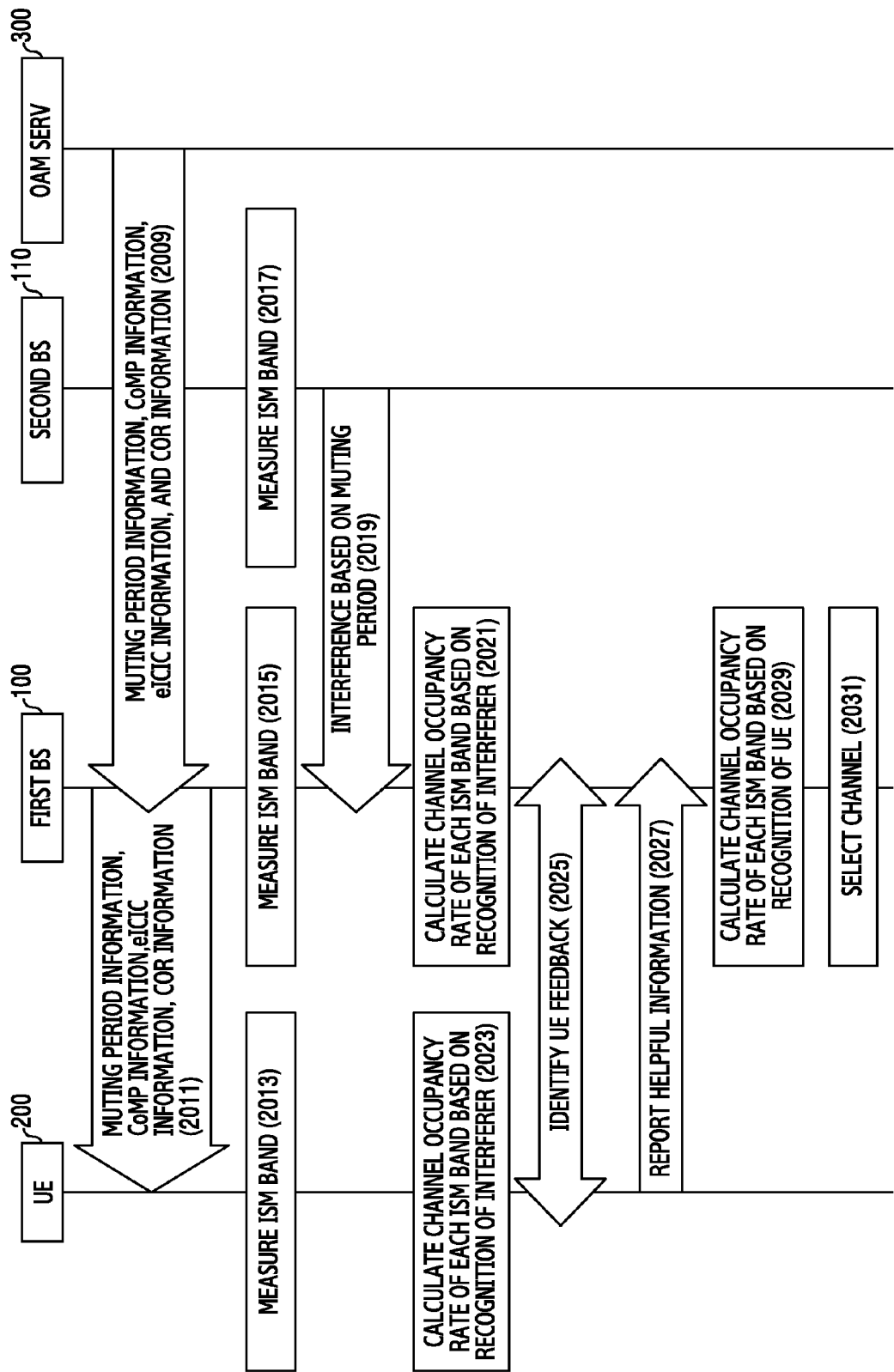
FIG. 20 is a diagram illustrating an example in which the BS selects a channel according to feedback information from the UE in the wireless communication system, according to an embodiment of the present invention.

FIG. 20 is a diagram illustrating an example in which a BS selects a channel according to feedback information from the UE in the wireless communication system, according to an embodiment of the present invention.

The OAM server 300 transmits muting period information, CoMP set information, eICIC set information, and COR information to the first BS 100 and the second BS 110 at step 2009. The muting period information includes the number of symbols, a start position, a resource position, and muting pattern information. The COR information corresponds to information for calculating the channel occupancy rate. The COR information includes a COR model and weighted value information. The COR calculation information includes a COR model and weighted value information.

The first BS 100 transmits the muting period information, the CoMP set information, the eICIC set information, the COR information received from the OAM server 300 to the UE 200 located within the coverage of the first BS 100 at step 2011.

The UE 200, and the BSs 100 and 110 measure each ISM band at steps 2013, 2015, and 2017. The measurement of each ISM band may be performed based on the size of reception power.

The second BS 110 outputs the signal based on the muting period information received from the OAM server 300 at step 2019. In the muting period, the second BS 110 outputs the signal based on the muting period. Accordingly, in the muting period, the first BS 100 measures the channel which is not based on the muting period. That is, the first BS 100 determines the channel measured in the muting period as a channel of an interferer which cannot be controlled by the first BS 100. The first BS 100 measures both the interference signal of the second BS 110 and the interference signal of the interferer which cannot be controlled in a period other than the muting period. Accordingly, the first BS 100 measures the interfering channel of the second BS 110 by using a difference between total interference measured in the period other than the muting period and the interference of the interferer which cannot be controlled and measured in the muting period. Further, the first BS 100 assigns different weighted values to the channel occupancy rate of the second BS 110 which can be controlled and the channel occupancy rate of the interferer which cannot be controlled, and calculates the least weighted value at step 2021.

The UE 200 calculates a least weighted value among the sums of the different weighted values assigned to the channel occupancy rates according to the type of interferers in the ISM band at step 2023. For example, the UE 200 calculates a least weighted value among the sums of the different weighted values assigned to the interferer which can be controlled and the interferer which cannot be controlled, using the muting pattern information, the CoMP set information, the eICIC set information, and the COR information received from the first BS 100.

The first BS 100 calculates a first weighted value corresponding to the least amount of interference and a second weighted value corresponding to the next least amount interference through the COR information received from the OAM server 300. The first BS 100 determines whether a difference between the second weighted value and the first weighted value is greater than a particular threshold. When the difference is greater than the particular threshold, the first BS 100 selects a channel having the first weighted value. However, when the difference is not greater than the particular threshold, the first BS 100 receives feedback information from the UE and selects the channel according to the feedback information. The first BS 100 transmits a message making a request for feedback information to the UE 200 in order to receive the feedback information from the UE 200, which transmits a response message of the request message to the first BS 100 at step 2025.

The UE 200 can also transmit the feedback information to the first BS 100 at step 2025. The feedback information includes channel occupancy information having weighted values according to the type of interferers calculated by the UE 200, preferred channel information, and barred channel information.

The first BS 100 calculates channel occupancy rates according to the feedback information received from the UE 200 in each ISM band at step 2029. More particularly, the first BS 100 calculates a least weighted value among the sums generated by adding the sum of the different weighted values assigned to the interferer which can be controlled and the interferer which cannot be controlled and the sum of the different weighted value assigned, by the UE 200, to the interferer which can be controlled and the interferer which cannot be controlled at step 2029, and selects a channel having the least weighted value at step 2031.

Figure 21:
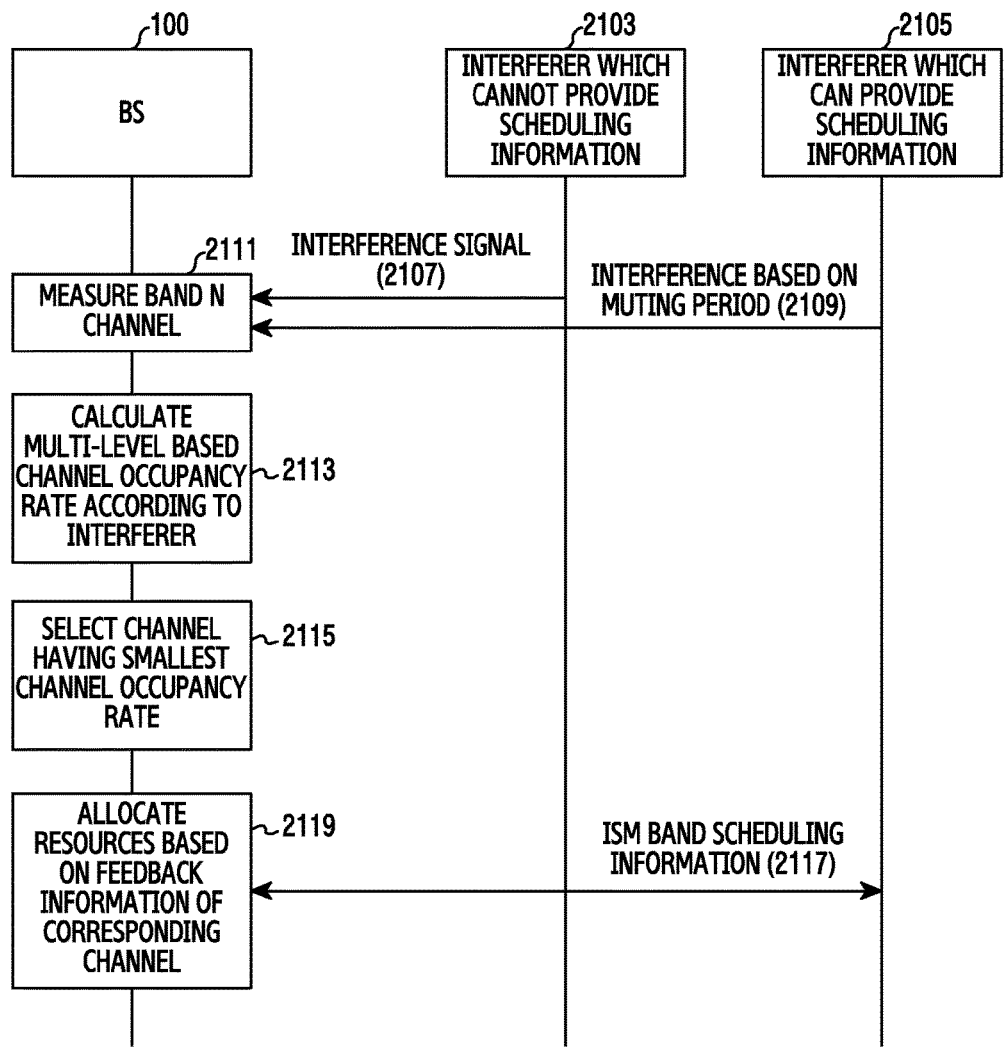
FIG. 21 is a diagram illustrating an example of a signal exchange for selecting a channel according to feedback of information on the recognition of the type of interferers through sharing of scheduling information and controlling transmission power by the BS in the wireless communication system, according to an embodiment of the present invention.

FIG. 21 is a diagram illustrating an example of a signal exchange for selecting a channel according to feedback of information on the recognition of the type of interferers through sharing of scheduling information and controlling transmission power by the BS in the wireless communication system, according to an embodiment of the present invention.

The BS 100 measures an interference signal 2107 and an interference signal 2109 based on the muting period from an interferer 2103 which cannot provide scheduling information and an interferer 2105 which can provide the scheduling information in a band N channel at step 2111.

The interferer 2103 which cannot provide the scheduling information may include a BS, to which the interference control technology cannot be applied from among BSs of the same operator as that of the BS 100, a BS of a different operator from that of the BS 100, and a communication device that uses a different communication technology from that of the BS 100. The interferer 2105 which can provide the scheduling information may be a BS, to which the interference control technology can be applied, from among the BSs operated by the same operator as that of the BS 100.

The BS 100 calculates a multi-level channel occupancy rate according to the interferer 2103 which cannot provide the scheduling information and the interferer 2105 which can provide the scheduling information at step 2113. The BS 100 selects a channel which may acquire a least weighted value among the sums of the different weighted values assigned to the channel occupancy rates of the interferer 2103 which cannot provide the scheduling information and the interferer 2105 which can provide the scheduling information at step 2115. The BS 100 and the interferer 2105, which can provide the scheduling information, exchange scheduling information of the ISM band at step 2117. The BS 100 allocates resources based on feedback information of the corresponding channel at step 2119.

Figure 22:
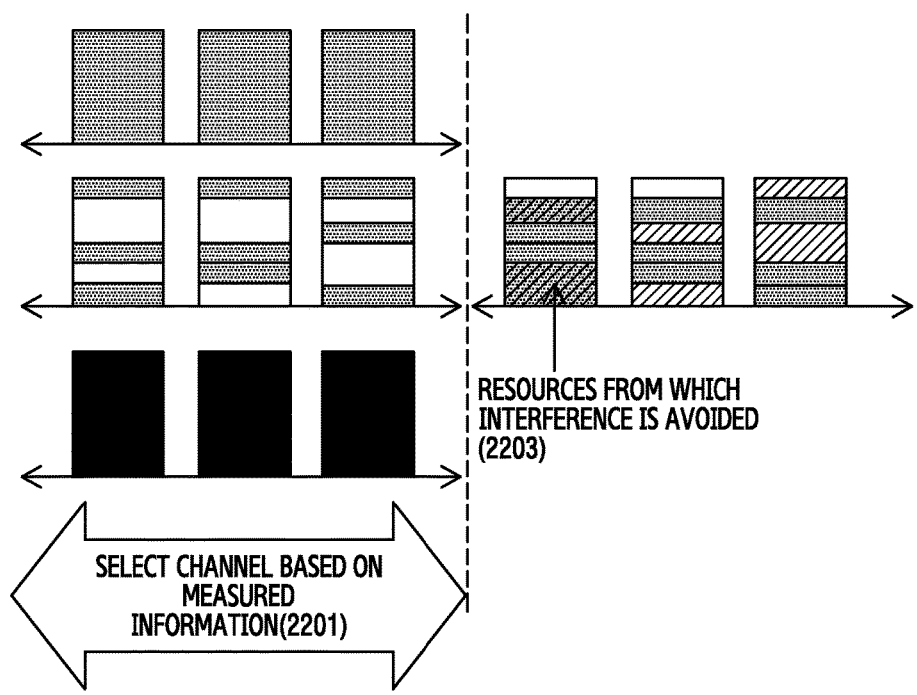
FIG. 22 is a diagram illustrating an example in which the BS avoids interference through feedback of scheduling information and allocates resources in the wireless communication system, according to an embodiment of the present invention.

FIG. 22 is a diagram illustrating an example in which a BS avoids interference through feedback of scheduling information and allocates resources in the wireless communication system, according to an embodiment of the present invention.

Referring to FIG. 22, the BS 100 measures an interference signal from each of the interferers which cannot provide scheduling information and the interferers which can provide the scheduling information and an interference signal according to a muting period. The BS 100 calculates a multi-level channel occupancy rate according to the interferer which cannot provide the scheduling information and the interferer which can provide the scheduling information. The BS 100 selects a channel which acquires a least sum of the sums values generated by assigning each different weighted values to the channel occupancy rates of the interferer which cannot provide the scheduling information and the interferer which can provide the scheduling information. That is, the channel may be selected according to the measured information at step 2201. The BS 100 and the interferer, which can provide the scheduling information, exchange scheduling information of the ISM band. The BS 100 receives resources from which interference is avoided at step 2203.

Figure 23:
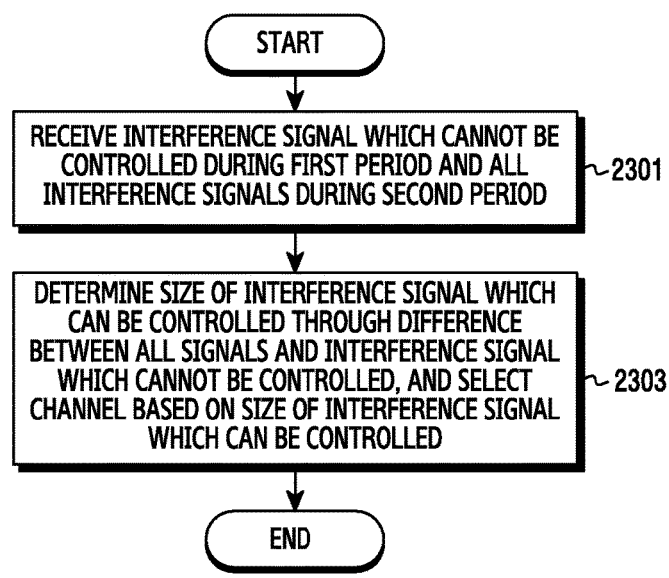
FIG. 23 is a flowchart illustrating a method used by the BS in the wireless communication system, according to an embodiment of the present invention.

FIG. 23 is a flowchart illustrating a method used by a BS in the wireless communication system, according to an embodiment of the present invention.

The communication device may be the BS 100 or the UE 200. Referring to FIG. 23, the communication device receives an interference signal which cannot be controlled during a first period and receives all interference signals during a second period at step 2301. The first period corresponds to a period in which the interferer, which can be controlled, does not allocate resources, and the interference signal from the interferer, which can be controlled, cannot be measured and the interference signal from the interferer, which cannot be controlled, can be measured in the first period.

When the communication device is the BS 100, the communication device may receive at least one piece of interference control information and information on the first period from the OAM server. When the communication device is the UE 200, the communication device may receive at least one piece of interference control information and information on the first period from the BS 100. The interference control information may include at least one piece of CoMP set information and eICIC set information. The information on the first period may include at least one of a number of symbols included in the first period, a start position of the first period, resource positions of the first period, and pattern information of the first period. The first period is a period in which the interferer, which can be controlled, does not allocate resources, and the interference signal from the interferer, which can be controlled, cannot be measured in the first period.

The communication device determines the interference signal which can be controlled, using a difference between all interference signals and the interference signal which cannot be controlled at step 2303. The communication device assigns different weighted values to the channel occupancy rate of the interference signal which cannot be controlled and the channel occupancy rate of the interference signal which can be controlled from among the channels, and selects a channel, which may acquire a least weighted value among the sums of the channel occupancy rates to which the weighted values are assigned, from the channels. When a difference between a sum of the channel occupancy rates in the channel having the least sum of the channel occupancy rate among the channels and a sum of channel occupancy rates of a channel having a next least sum of the channel occupancy rate among the channels is greater than a particular threshold, the communication device selects the channel having the least sum of the channel occupancy rate from the plurality of channels.

When the communication device is the UE 200, the communication device transmits information on the sum of the channel occupancy rates calculated in the channels to the BS 100. When the communication device is the BS 100, the communication device receives the information on the sum of the channel occupancy rates calculated by at least one UE in the channels from the at least one UE.

When the communication device is the BS 100, the communication device selects, from the channel, a channel having a least channel occupancy rate generated by adding the sum of the channel occupancy rates and the sum of the channel occupancy rates calculated by the at least one UE in the channels.

Figure 24:
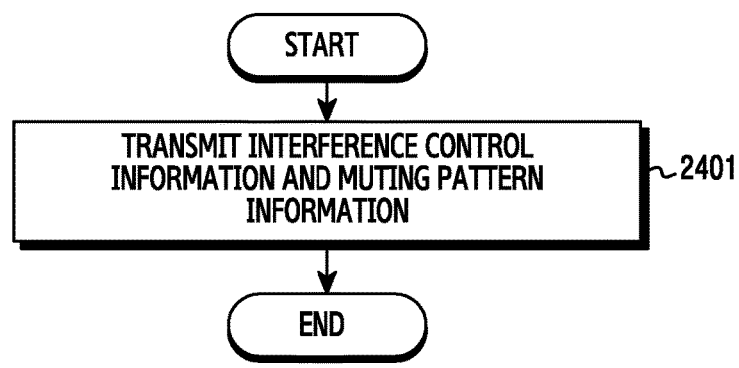
FIG. 24 is a flowchart illustrating a method of an Operation Administration Maintenance (OAM) server in the wireless communication system, according to an embodiment of the present invention.

FIG. 24 is a flowchart illustrating a method of the OAM server in the wireless communication system, according to an embodiment of the present invention.

Referring to FIG. 24, the OAM server 300 transmits at least one piece of set information from among interference control information and first period information to at least one BS at step 2401. The interference control information may include at least one piece of CoMP set information and eICIC set information. The first period information may include at least one of a number of symbols included in the first period, a start position of the first period, resource positions of the first period, and pattern information of the first period.

Figure 25:
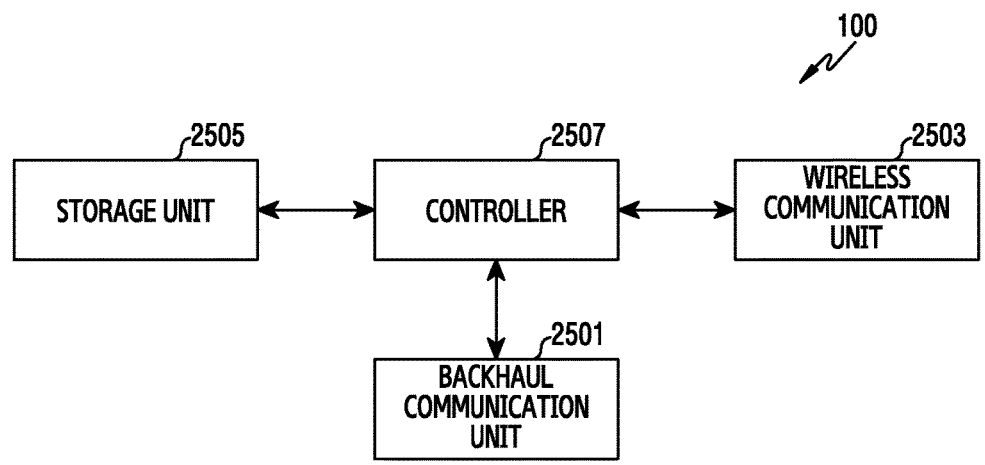
FIG. 25 is a diagram of the BS apparatus in the wireless communication system, according to an embodiment of the present invention.

FIG. 25 is a diagram of a BS apparatus in the wireless communication system, according to an embodiment of the present invention.

A backhaul communication unit 2501 provides an interface for performing communication with other nodes within the network. That is, the backhaul communication unit 2501 converts a bitstream transmitted to a different node, for example, another BS or a core network from the BS 100 into a physical signal and converts a physical signal received from the different node into a bitstream.

A wireless communication unit 2503 processes transmission/reception of a wireless signal of data input/output through an antenna. For example, in transmission, channel coding and spreading are performed on data to be transmitted, and RF processing is performed. In reception, a received RF signal is converted into a baseband signal, and the baseband signal is de-spread and channel-decoded, and thus data is reconstructed.

The wireless communication unit 2503 receives an interference signal which cannot be controlled in channels during a first period and all interference signals in the channels during a second period. The backhaul communication unit 2501 receives information on the first period. The backhaul communication unit 2501 receives at least one piece of interference control information and the information on the first period from the OAM server 300. The wireless communication unit 2503 transmits at least one piece of the interference control information and the information on the first period from at least one UE. The wireless communication unit 2503 transmits a message requesting information on a sum of the channel occupancy rates calculated in the channels from the at least one UE. The wireless communication unit 2503 receives the information on the sum of the channel occupancy rates calculated by at least one UE in the channels from the at least one UE.

The backhaul communication unit 2501 receives first synchronization control signals for a first communication service from a plurality of different BSs and receives a second synchronization control signal for a second communication service from one or more different BSs. The wireless communication unit 2503 receives signals including an interference signal which can be controlled and an interference signal which cannot be controlled; the interference signal which can be controlled and the interference signal which cannot be controlled are associated with the second communication service.

The backhaul communication unit 2501 may be divided into a backhaul transmitter and a backhaul receiver. Further, the wireless communication unit 2503 may be divided into a wireless transmitter and a wireless receiver.

A storage unit 2505 stores micro codes of a program for processing and control of a controller 2507 and various pieces reference data. In addition, the storage unit 2505 stores interference control information including at least one piece of CoMP set information and eICIC set information. The storage unit 2505 stores information on the first period. The information on the first period may include at least one of a number of symbols included in the first period, a start position of the first period, resource positions of the first period, and pattern information of the first period. The storage unit 2505 stores channel occupancy rate calculation information. The channel occupancy rate calculation information may include equations for calculating the channel occupancy rate and information on weighted values.

The controller 2507 controls the overall operations of a control device. For example, the controller 2507 performs processing and control for voice communication and data communication. In addition, the controller 2507 determines a size of the interference signal which can be controlled, using a difference between all signals transmitted/received from/by the BS and the interference signal which cannot be controlled, and selects a channel according to a size of the interference signal which can be controlled. The controller 2507 selects a channel having a least amount of interference by using the size of the interference signal which can be controlled. The controller 2507 assigns different weighted values to the channel occupancy rate of the interference signal which cannot be controlled and the channel occupancy rate of the interference signal which can be controlled from among the channels, and selects a channel, having a least value among the sums of the channel occupancy rates to which the weighted values are assigned, from the channels. When the difference between the sum of the channel occupancy rates in the channel having the least sum of the channel occupancy rate among the channels and the sum of channel occupancy rates of a channel having the next least sum of the channel occupancy rate among the channels is greater than a particular threshold, the controller 2507 selects the channel having the least sum of the channel occupancy rate from the plurality of channels. When the difference is not greater than the particular threshold, the controller 2507 selects a channel, according to information on the sum of the channel occupancy rates calculated by at least one UE, from the at least one UE. The controller 2507 selects, from the plurality of channels, a channel having the least sum from sums generated by adding the sum of the channel occupancy rates and the sum of the channel occupancy rates calculated by the at least one UE in the channels.

The controller 2507 detects a synchronization frame for a first synchronization signal from the first synchronization control signal and detects a second synchronization signal from the second synchronization control signal in the synchronization frame. The controller 2507 detects the interference signal which cannot be controlled, by subtracting the interference signal which can be controlled, from the received signal. The controller 2507 selects one of the plurality of channels as a channel for the second communication service based on the sum of values generated by multiplying the interference signal which can be controlled and the interference signal which cannot be controlled with respect to a plurality of channels by different weighted values.

Figure 26:
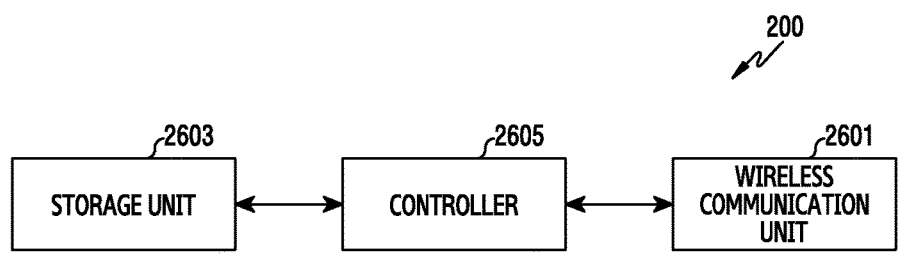
FIG. 26 is a diagram of the UE apparatus in the wireless communication system, according to an embodiment of the present invention.

FIG. 26 is a diagram of a UE apparatus in the wireless communication system, according to an embodiment of the present invention.

A wireless communication unit 2601 performs a function of processing transmission/reception of a wireless signal of data input/output through an antenna. For example, in transmission, channel coding and spreading are performed on data to be transmitted, and the RF processing is performed. In reception, a received RF signal is converted into a baseband signal, and the baseband signal is de-spread and channel-decoded, and thus data is reconstructed. In addition, the wireless communication unit 2601 receives at least one piece of interference control information and first period information from the BS 100. The wireless communication unit 2601 receives a message requesting information on a sum of the channel occupancy rates calculated in the channels from the BS 100. The wireless communication unit 2601 transmits information based on the sum of the channel occupancy rates calculated in the channels to the BS 100.

The wireless communication unit 2601 may be divided into a wireless transmitter and a wireless receiver.

A storage unit 2603 stores micro codes of a program for processing and control of a controller 2605 and various pieces reference data. In addition, the storage unit 2603 stores interference control information including at least one piece of CoMP set information and eICIC set information. The storage unit 2603 stores information on the first period. The information on the first period may include at least one of a number of symbols included in the first period, a start position of the first period, resource positions of the first period, and pattern information of the first period. The storage unit 2603 stores channel occupancy rate calculation information. The channel occupancy rate calculation information may include equations for calculating the channel occupancy rate and information on weighted values.

The controller 2605 controls the overall operations of a control device. For example, the controller 2605 performs processing and control for voice communication and data communication. In addition, the controller 2605 y determines a size of the interference signal which can be controlled, using a difference between all signals transmitted/received from/by the UE and the interference signal which cannot be controlled, and selects a channel according to the size of the interference signal which can be controlled. The controller 2605 selects a channel having a least amount of interference by using the size of the interference signal which can be controlled. The controller 2605 may assign different weighted values to the channel occupancy rate of the interference signal which cannot be controlled and the channel occupancy rate of the interference signal which can be controlled from among the channels, and selects a channel having a least weighted value from among the channel occupancy rates to which the weighted values are assigned among the channels.

Figure 27:
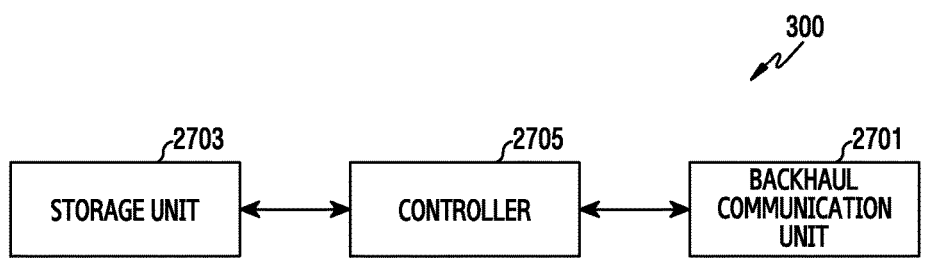
FIG. 27 is a diagram of the OAM server apparatus in the wireless communication system, according to an embodiment of the present invention.

FIG. 27 is a diagram of the OAM server apparatus in the wireless communication system, according to an embodiment of the present invention.

A backhaul communication unit 2701 provides an interface for performing communication with other nodes within the network. That is, the backhaul communication unit 2701 converts a bitstream transmitted to other nodes, for example, the BS 100 and a core network from the OAM server 300 into a physical signal and converts a physical signal received from other nodes into a bitstream. In addition, the backhaul communication unit 2701 transmits at least one piece of interference control information and first period information to at least one BS. The interference control information may include at least one piece of CoMP set information and eICIC set information. The first period information may include at least one of a number of symbols included in the first period, a start position of the first period, resource positions of the first period, and pattern information of the first period.

The backhaul communication unit 2701 may be divided into a backhaul transmitter and a backhaul receiver.

A storage unit 2703 stores micro codes of a program for processing and control of a controller 2705 and various pieces reference data. In addition, the storage unit 2703 stores interference control information including at least one piece of CoMP set information and eICIC set information. The storage unit 2703 stores information on the first period. The information on the first period may include at least one of a number of symbols included in the first period, a start position of the first period, resource positions of the first period, and pattern information of the first period. The storage unit 2703 stores channel occupancy rate calculation information. The channel occupancy rate calculation information may include equations for calculating the channel occupancy rate and information on weighted values.

The controller 2705 controls the overall operations of a control device. For example, the controller 2705 performs processing and control for voice communication and data communication. In addition, the controller 2705 may transmit at least one piece of interference control information and first period information to at least one BS.

The aforementioned methods may be implemented by hardware, software, or a combination of hardware and software.

In the implementation of software, a non-transitory computer-readable storage medium for storing one or more programs (software modules) may be provided. The one or more programs stored in the non-transitory computer-readable storage medium may be configured for execution by one or more processors within the communication device, e.g., the BSs, UEs, and APs. The at least one program may include instructions that cause the communication device to perform the methods according to various embodiments of the present invention. While the present invention has been described with reference to certain embodiments thereof, it should be understood by those skilled in the art that many variations and modifications of the method and apparatus described herein will still fall within the scope of the present invention as defined in the appended claims and their equivalents.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

What is claimed is:

1. An apparatus of a base station (BS) in a wireless communication system, the apparatus comprising:
    a transceiver configured to receive an interference signal which cannot be controlled during a first period, and interference signals during a second period with respect to a plurality of channels; and
    a processor configured to determine a size of an interference signal which can be controlled, using a difference between a measurement of the interference signals during the second period and a measurement of the interference signal which cannot be controlled, and select one of the plurality of channels according to the determined size of the interference signal which can be controlled.

2. The apparatus of claim 1, wherein the processor is further configured to select a channel having a least amount of interference from the plurality of channels by using the determined size of the interference signal which can be controlled.

3. The apparatus of claim 2, wherein the first period is a period in which an interferer, which can be controlled, does not allocate resources to some frequency bands of frequency bands of the selected channel, and an interference signal from the interferer, which can be controlled, is not received in the first period.

4. The apparatus of claim 3, further comprising a backhaul communication unit configured to receive information on the first period.

5. The apparatus of claim 4, wherein the information on the first period includes at least one of a number of symbols included in the first period, a start position of the first period, resource positions of the first period, and pattern information of the first period.

6. The apparatus of claim 5, wherein the processor is further configured to assign different weighted values to a channel occupancy rate of the interference signal which cannot be controlled and a channel occupancy rate of the interference signal which can be controlled from among the plurality of channels, and select, from the plurality of channels, a channel having a least weighted value from among the channel occupancy rates to which the weighted values are assigned.

7. The apparatus of claim 6, wherein the backhaul communication unit is further configured to receive at least a portion of interference control information, and the information on the first period is received from an operation administration maintenance (OAM) server.

8. The apparatus of claim 7, wherein the transceiver is further configured to transmit the received at least a portion of the interference control information and the information on the first period to at least one user equipment (UE).

9. The apparatus of claim 5, wherein the backhaul communication unit is further configured to receive at least a portion of the interference control informationand the information on the first period from at least one another BS.

10. The apparatus of claim 8, wherein the processor is further configured to select the channel having the least weighted value, when a difference between a sum of the channel occupancy rates of the channel having the least weighted value of the channel occupancy rate from among the channels and a sum of channel occupancy rates of a channel having a next least weighted value of the channel occupancy rate from among the channels is greater than a predetermined threshold.

11. The apparatus of claim 10, wherein, when the difference is not greater than the predetermined threshold, the processor is further configured to select a channel from the at least one UE according to information on the sum of the channel occupancy rates calculated by the at least one UE.

12. The apparatus of claim 11, wherein the transceiver is further configured to transmit, to the at least one UE, a message requesting the information on the sum of the channel occupancy rates calculated by the at least one UE.

13. The apparatus of claim 12, wherein the backhaul communication unit is further configured to receive the message requesting the information on the sum of the channel occupancy rates calculated in the plurality of channels from the at least one UE.

14. The apparatus of claim 13, wherein the backhaul communication unit is further configured to transmit the information on the sum of the channel occupancy rates calculated in the plurality of channels to at least one anther BS.

15. The apparatus of claim 12, wherein the transceiver is further configured to receive the information on the sum of the channel occupancy rates calculated by the at least one UE from the at least one UE.

16. The apparatus of claim 15, wherein the processor is further configured to select a channel having a least sum of the channel occupancy rateare calculated by the BS, and the channel occupancy rates are calculated by the at least one UE.

17. A method of operating a base station (BS) in a wireless communication system, the method comprising:
receiving an interference signal which cannot be controlled during a first period, and interference signals during a second period with respect to a plurality of channels;
determining a size of an interference signal which can be controlled, using a difference between a measurement of the interference signals during the second period and a measurement of the interference signal which cannot be controlled; and
selecting one of the plurality of channels according to the determined size of the interference signal which can be controlled.

18. The method of claim 17, wherein determining the size of the interference signal which can be controlled comprises selecting a channel having a least amount of interference from the plurality of channels by using the determined size of the interference signal which can be controlled.

19. The method of claim 18, wherein the first period is a period in which an interferer, which can be controlled, does not allocate resources to some frequency bands of frequency bands of the selected channel, and an interference signal from the interferer, which can be controlled, is not received in the first period.

20. The method of claim 19, wherein receiving the interference signal, which cannot be controlled during the first period, and the interference signals during the second period with respect to the plurality of channels, comprises receiving information on the first period.

21. The method of claim 20, wherein the information on the first period includes at least one of a number of symbols included in the first period, a start position of the first period, resource positions of the first period, and pattern information of the first period.

22. The method of claim 21, wherein selecting the channel having the smallest interference comprises assigning different weighted values to a channel occupancy rate of the interference signal which cannot be controlled, and a channel occupancy rate of the interference signal which can be controlled, from among the plurality of channels, and selecting, from the plurality of channels, a channel having a least weighted value from among the channel occupancy rates to which the weighted values are assigned.

23. The method of claim 22, wherein receiving the interference signal which cannot be controlled during the first period, and the interference signals during the second period with respect to the plurality of channels comprises receiving at least a portion of interference control information, and receiving the information on the first period from an operation administration maintenance (OAM) server.

24. The method of claim 23, further comprising transmitting at least a portion of the interference control information and the information on the first period to at least one user equipment (UE).

25. The method of claim 21, wherein receiving the interference signal which cannot be controlled, during the first period and the interference signals during the second period with respect to the plurality of channels comprises receiving at least a portion of the interference control information and the information on the first period at a backhaul unit of the BS.

26. The method of claim 24, wherein selecting the channel having the least amount of interference comprises, when a difference between a sum of the channel occupancy rates of the channel having the least weighted value of the channel occupancy rate from among the channels and a sum of channel occupancy rates of a channel having a next least sum of the channel occupancy rate from among the channels is greater than a predetermined threshold, selecting the channel having the least sum of the channel occupancy rate from the plurality of channels.

27. The method of claim 26, wherein selecting the channel having the least amount of interference comprises, when the difference is not greater than the predetermined threshold, selecting a channel according to information on the sum of the channel occupancy rates calculated by the at least one UE.

28. The method of claim 27, further comprising transmitting, to the at least one UE, a message requesting the information on the sum of the channel occupancy rates calculated by the at least one UE.

29. The method of claim 28, further comprising receiving the message requesting the information on the sum of the channel occupancy rates calculated in the plurality of channels from the at least one UE.

30. The method of claim 29, further comprising transmitting the information on the sum of the channel occupancy rates calculated in the plurality of channels to at least one BS.

31. The method of claim 28, further comprising receiving the information on the sum of the channel occupancy rates calculated by the at least one UE in the plurality of channels from the at least one UE.

32. The method of claim 31, wherein the selecting the channel having the least amount interference comprises selecting a channel having a least sum of the channel occupancy rateare calculated by the BS, and the channel occupancy rate are calculated by the at least one UE.

* * * * *